United States Patent [19]

Kaneko et al.

[11] Patent Number: 5,379,275
[45] Date of Patent: Jan. 3, 1995

[54] THERMOMAGNETIC RECORDING METHOD USING A RECORDING LIGHT POWER MODULATED ACCORDING TO THE SIGNAL TO BE MODULATED

[75] Inventors: Masahiko Kaneko, Kanagawa; Katsuhisa Aratani; Yoshihiro Muto, both of Chiba, all of Japan

[73] Assignee: Sony Corporation, Tokyo, Japan

[21] Appl. No.: 131,854

[22] Filed: Oct. 5, 1993

Related U.S. Application Data

[63] Continuation of Ser. No. 377,944, Jul. 10, 1989, abandoned.

[30] Foreign Application Priority Data

| Jul. 13, 1988 | [JP] | Japan | 63-174695 |
| Oct. 28, 1988 | [JP] | Japan | 3-272400 |
| Jan. 13, 1989 | [JP] | Japan | 1-6453 |
| Jan. 13, 1989 | [JP] | Japan | 1-6454 |

[51] Int. Cl.$^6$ .............................................. G11B 13/04
[52] U.S. Cl. ........................................ 369/13; 360/114; 360/59
[58] Field of Search ................. 369/13, 14; 360/114, 360/59; 365/122; 428/694

[56] References Cited

U.S. PATENT DOCUMENTS

| 4,645,722 | 2/1987 | Katayama et al. | 365/122 X |
| 4,794,560 | 12/1988 | Bell et al. | 365/122 |
| 4,842,956 | 6/1989 | Kobayashi | 428/611 |
| 4,910,622 | 3/1990 | Saito et al. | 369/13 |

FOREIGN PATENT DOCUMENTS

| 0227480 | 7/1987 | European Pat. Off. . |
| 0257530 | 3/1988 | European Pat. Off. . |
| 0258978 | 3/1988 | European Pat. Off. . |
| 0288069 | 10/1988 | European Pat. Off. . |
| 63-117355 | 11/1986 | Japan . |
| 63-304448 | 12/1988 | Japan . |
| 63-316343 | 12/1988 | Japan . |

OTHER PUBLICATIONS

SPIE vol. 1078 Optical Data Storage Topical Meeting (1989) "Overwriting On A Magneto-Optical Disk With Magnet Triple Layers By Means Of The Light Intensity Modulation Method", pp. 258–264.

*Primary Examiner*—Hoa T. Nguyen
*Attorney, Agent, or Firm*—Hill, Steadman & Simpson

[57] ABSTRACT

The present invention adopts as the basic structure of its thermomagnetic recording medium an arrangement consisting of a first and a second magnetic thin film having perpendicular anisotropy and a third magnetic thin film having in-plane magnetic anisotropy or small perpendicular magnetic anisotropy interposed therebetween, formed into a laminated structure by being magnetically coupled to the adjoining films in turn, modulates and switches, in accordance with information to be recorded, a first heating condition and a second heating condition, with the medium applied with a predetermined external magnetic field $H_{ex}$ in the direction perpendicular to the plane of the film, the first condition being that for raising temperature of the medium to a first temperature $T_1$ which is virtually above the Curie temperature $T_{C1}$ of the first magnetic thin film and not causing reversal of the magnetic moment in the second magnetic thin film and the second condition being that for raising temperature of the same to a second temperature $T_2$ which is virtually above the Curie temperature $T_{C1}$ and sufficient to cause reversal of the magnetic moment in the second magnetic thin film, to thereby form an information bit (magnetic domains) in the first magnetic thin film, and adapts during the course the medium is cooled from the heated states such that two states established by the different relationships between the directions of magnetization of the first and second magnetic thin films are finally formed whereby the recording of the information is performed to achieve overwriting.

4 Claims, 26 Drawing Sheets

THERMOMAGNETIC RECORDING METHOD USING A RECORDING LIGHT POWER MODULATED ACCORDING TO THE SIGNAL TO BE MODULATED

This is a continuation of application Ser. No. 377,944, filed Jul. 10, 1989, now abandoned.

BACKGROUND OF THE INVENTION

The present invention relates to a thermomagnetic recording method such as, for example, a thermomagnetic recording method using irradiation of a laser beam.

In the method to record information by thermomagnetic recording in a recording medium, from which information is reproduced by reading information bits (magnetic domains) formed thereon by virtue of magneto-optical interaction, the recording medium having a magnetic thin film formed of a vertically magnetizable film is subjected in advance to initialization, i.e., to a treatment to orient the magnetization in the medium into one direction perpendicular to the plane of the film, and thereafter, magnetic domains having vertical magnetization in the reverse direction to the initial magnetization are formed by heating the medium locally by irradiation of a laser beam or the like, and thereby, the information is recorded thereon as a binarized information bits.

In such a thermomagnetic recording method, when altering recorded information, a process must, prior to the alteration, be performed to erase the recorded information (the process corresponding to the above described initialization), so that a certain time is taken to perform the erasing process, and therefore, recording at a high transmission rate cannot be achieved. As countermeasures against that, there have been proposed various real-time recording methods in which overwriting is made possible and thereby the period of time for performing such an independent erasing process can be eliminated. Among such thermomagnetic recording methods executing the overwrite, hopeful ones, for example, are that applies modulated external magnetic field to the medium and that uses two heads, an erasing head as well as a recording head. In the method using modulated external magnetic field, the recording is performed as disclosed, for example, in Japanese Laid-open Patent Publication No. 60-48806 by applying a magnetic field with the polarity corresponding to the state of an input digital signal current to a recording medium, which is provided thereon with an amorphous ferrimagnetic thin film having an axis of easy magnetization perpendicular to the film plane, at its region irradiated by a temperature raising beam.

When it is attempted to achieve a high speed recording at a high information transmission rate by the above described external magnetic field modulation method, an electromagnet operating at the rate, for example, on the order of one MHz becomes necessary, and a problem arises that it is difficult to fabricate such an electromagnet, and even if it is fabricated, consumed power and heat generated thereby become huge, and therefore, it cannot be put to practical use. Meanwhile, the two-head method requires an extra head and the two heads must be located apart, and therefore, such a problem occurs that a heavy-load drive system is required and the system becomes uneconomical and unsuitable for mass production.

The present applicant earlier proposed thermomagnetic recording methods intended to solve these problems in Japanese Patent Application Nos. 61-194961 and 61-194962 (corresponding to U.S. patent application Ser. No. 87,440, filed Aug. 20, 1987 which is U.S./4,955,007, and European Patent Application laid open under the number of EP-A-257 530). The thermomagnetic methods proposed in these applications are such that use a thermomagnetic recording medium provided with a first and a second laminated structure of rare earth-transition metal magnetic thin films and switch and modulate, in accordance with information to be recorded, for example, of "0" and "1", a first heating condition to heat the medium to a first temperature $T_1$ which is virtually above the Curie temperature $T_{C1}$ of the first magnetic thin film and not reversing the sublatice magnetization in the second magnetic thin film and a second heating condition to heat the same to a second temperature $T_2$ which is above the temperature $T_{C1}$ and sufficient to reverse the sub-lattice magnetization in the second magnetic thin film, with the medium applied with a required first external magnetic field, so that, in the cooling stage, the direction of sub-lattice magnetization in the first magnetic thin film is brought into agreement with the direction of the sub-lattice magnetization in the second magnetic thin film by virtue of first and second exchange coupling force, whereby recorded bits (magnetic domains), for example, of "0" and "1" are formed in the first magnetic thin film, and the sub-lattice magnetization in the second magnetic thin film is reversed by virtue of a second external magnetic field or by virtue of only the first external magnetic field at room temperature when the composition of the second magnetic thin film has been selected so as to have its compensation temperature between the second temperature $T_2$ and room temperature, and thereby obtain the conditions to make overwriting possible.

Since, throughout the above processes, there is no need of performing a special process (taking a time) for erasing, a high transmission rate can be attained, and thereby, the problems involved in the above described two-head system or the external magnetic field modulation system can be solved.

The thermomagnetic recording method according to Japanese Patent Application No. 61-194961 will be described below. The recording of information, for example, of "0" and "1" in this recording method is performed, as shown in FIG. 1 which schematically indicates the above described magnetized states of the first end second magnetic thin films 1 and 2 with small arrows relative to temperature T, by providing, at room temperature $T_R$, a state A with the directions of magnetization in both the magnetic thin films 1 and 2 oriented in one direction and a state B with the same oriented in the reverse directions to each other. And these records are obtained by application of the external magnetic field $H_{ex}$ to the medium and heating the same to the first and second temperatures $T_1$ and $T_2$ by laser beam irradiation. For example, a laser beam is first impinged on the position in the state A, with the intensity or time of irradiation of the laser beam modulated in accordance with the recording signal, so that the heating temperature T is brought to the first heating temperature $T_1$ virtually above the Curie temperature $T_{C1}$ of the first magnetic thin film 1 and causing no reversal of magnetization in the second magnetic thin film 2 under the influence of the required external magnetic field $H_{ex}$. By such heating, the first magnetic thin film 1 exhibits a state C where it loses its magnetization but, when the laminated film of the magnetic thin films 1 and 2, after the heating has been finished, is cooled below the temperature $T_{C1}$, magnetization is produced in the first magnetic thin film 1. In this case, since it has been previously adapted such that the exchange coupling force with the second magnetic thin film 2 is dominant, the direction of magnetization in the first magnetic thin film 1 is oriented into the same direction as that of the second magnetic thin film 2. Namely, the state A is produced whereby information, for example, of a "0" is recorded.

Otherwise, the heating temperature T is brought to the second heating temperature $T_2$ beyond the above described temperature $T_1$ and sufficient to reverse the magnetization in the second magnetic thin film 2 with the external magnetic field $H_{ex}$ applied. By performing such heating, a state D in which the first magnetic thin film 1 has lost its magnetization and the second magnetic thin film 2 has reversed its magnetization is brought about. But, when the heating is finished and the laminated film of the magnetic thin films 1 and 2 are cooled below the temperature $T_{C1}$, the first magnetic thin film 1 is subjected to the exchange coupling force from the second magnetic thin film 2, whereby a state E, i.e., a magnetized state opposite to the original, initialized state, is produced but by virtue of a subsidiary external magnetic field $H_{sub}$ applied in the vicinity of room temperature $T_R$, the direction of the second magnetic thin film 2 is reversed, and thereby, a magnetized state B with magnetic domain walls 3 formed between both the magnetic thin films 1 and 2, the state B being only different from the magnetized state A in that the magnetization in the first magnetic thin film 1 has been reversed, is brought about, and thus, recording of information, for example, of a "1" is achieved.

The recording of information of "0" and "1" is achieved by obtaining the state A and state B as described above. In this case, the light-intensity-modulated overwriting is applicable to both the state A and the state B. More particularly, by having any position of those in the state A and the state B heated to the temperature $T_1$ or $T_2$ past the state C, by virtue of selected temperatures $T_1$ and $T_2$ as described above, the overwrite of the state A or the state B corresponding to the information "0" or "1" can be achieved no matter whether the original state was the state A or the state B.

In the magnetic recording medium of the described structure, the surface between the magnetic thin films 1 and 2 forming the laminated film is under the influence of exchange energy, whereby the magnetic domain walls 3 are formed in the first state B. The domain wall energy $\sigma_W$ is expressed as $$\sigma_w \approx 2(\sqrt{A_1 K_1} + \sqrt{A_2 K_2}) \tag{1}$$

($A_1$ and $A_2$, $K_1$ and $K_2$ are exchange constants and perpendicular magnetic anisotropic constants of the first and second magnetic thin films 1 and 2.)

As the conditions required for achieving the overwrite, the condition under which transition from the state B to the state A does not take place at room temperature ($-20°$ C. to $60°$ C.) is given by $$H_{C1} > H_{W1} = \sigma_W/2M_{S1}h_1 \tag{2}$$

Also, the condition under which transition from the state B to the state E does not take place is given by $$H_{C2} > H_{W2} = \sigma_W/2M_{S2}h_2 \tag{3}$$

Further, in the state E, in order that the magnetization in the first magnetic thin film 1 is not reversed by the subsidiary external magnetic field $H_{sub}$, the following condition must be satisfied:

$$H_{C1} \pm H_{W1} > H_{sub} \tag{4_1}$$

where the sign $\pm$ on the left-hand side becomes sign "+" when the first magnetic thin film 1 is a rare earth metal rich film and the second magnetic thin film 2 is transition metal rich film, whereas it becomes sign "−" when both the first and the second magnetic thin films 1 and 2 are transmission metal rich.

Besides, in order that the transition from the state E to the state B takes place, the condition $$H_{C2} + H_{W2} < H_{sub} \tag{4_2}$$

must be satisfied.

Further, where the heated temperature is in the vicinity of the Curie temperature $T_{C1}$ of the first magnetic thin film 1, in order that the transition from the state C to the state A takes place, that is, the direction of magnetization in the first magnetic thin film 1 is brought into agreement with the direction of the magnetization in the second magnetic thin film 2, the condition $$H_{W1} > H_{C1} + H_{ex} \tag{5}$$

must be satisfied. Besides, in order that transition from the state B to the state E does not take place, the condition $$H_{C2} - H_{W2} < H_{ex} \tag{6}$$

must be satisfied.

In the above expressions, $H_{W1}$ and $H_{W2}$ are quantities defined by the expressions (2) and (3), and $H_{C1}$ and $H_{C2}$, $M_{S1}$ and $M_{S2}$, and $h_1$ and $h_2$ respectively are coercive forces, saturation magnetizations, and thicknesses of the first and second magnetic thin films.

As apparent from these, in order to satisfy the expressions (2) and (3), it is preferred that the domain wall energy $\sigma_W$ at room temperature is as small as possible, but, when assuming that $K \approx 4 \times 10^6$ erg/cm$^3$, $A = 2 \times 10^{-6}$ erg/cm, we obtain $$\sigma_w \approx 3.6 \text{ erg/cm}^2.$$

Meanwhile, actual measurements on the hysteresis loop of the two-layer film give $\sigma_W = 3$ to 6 erg/cm$^2$. Now, assuming that $\sigma_W = 5$ erg/cm$^2$ and using $H_c M_s \approx 0.45 \times 10^6$ erg/cm$^2$ and $H_{ex} = 2$ kOe, we obtain $h_2 = 1100$ Å, $H_{C2} = 4$kOe, and $H_{W2} \leq 2$kOe as approximate values to satisfy the condition of the expression (6) at room temperature $T_R$, i.e., to satisfy the condition $H_{C2} - H_{W2} < 2$kOe. Thus, a problem is posed that the thickness $h_2$ of the second magnetic thin film 2 becomes large and the subsidiary external magnetic field $H_{sub}$ becomes large from the expression ($4_2$).

OBJECTS OF THE INVENTION

It is an object of the present invention to provide an improved thermomagnetic recording method capable of real-time overwriting.

It is another object of the present invention to provide a thermomagnetic recording method in which recorded bit is stabilized.

It is a further object of the present invention to provide a thermomagnetic recording method in which external magnetic field applied to a thermomagnetic recording medium to initialize the same is reduced.

It is a still further object of the present invention to provide a thermomagnetic recording method in which higher Kerr rotation angle is obtained upon playback.

DESCRIPTION OF THE PREFERRED EMBODIMENTS

In the present invention, it is adapted such that the above described domain wall energy $\sigma_W$ at room temperature is made small and the temperature characteristic of $\sigma_W$ satisfying the above expression (5) is improved to thereby reduce the film thickness of the second magnetic thin film 2 and lower the subsidiary external magnetic field $H_{sub}$.

Figure 2:
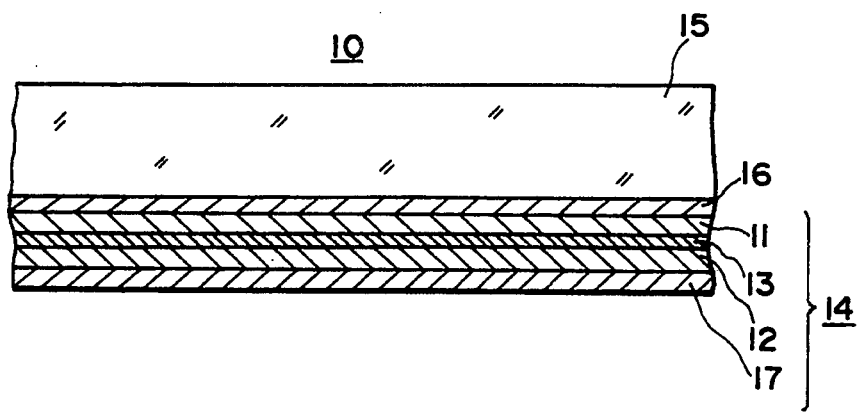
FIGS. 2, 7, 8, 21, 22, 28, and 34 are each a sectional view of a thermomagnetic recording medium used in the present invention.

More particularly, in the present invention, a thermomagnetic recording medium 10 as shown in FIG. 2 is prepared. The thermomagnetic recording medium 10 is provided thereon with a laminated film 14 made up of first and second magnetic thin films 11 and 12 having perpendicular magnetic anisotropy with a third magnetic thin film 13 having an in-plane magnetic anisotropy or a small amount of perpendicular magnetic anisotropy sandwiched therebetween, these films being magnetically coupled and laminated in turn to the adjoining one. The third magnetic thin film 13 is preferred, even if it has perpendicular magnetic anisotropy, to have sufficiently small perpendicular magnetic anisotropy as against the perpendicular magnetic anisotropy of the first and second magnetic thin films 11 and 12, as low as, for example, $1 \times 10^6$ erg/cm$^3$ in perpendicular magnetic anisotropy constant.

Figure 3:
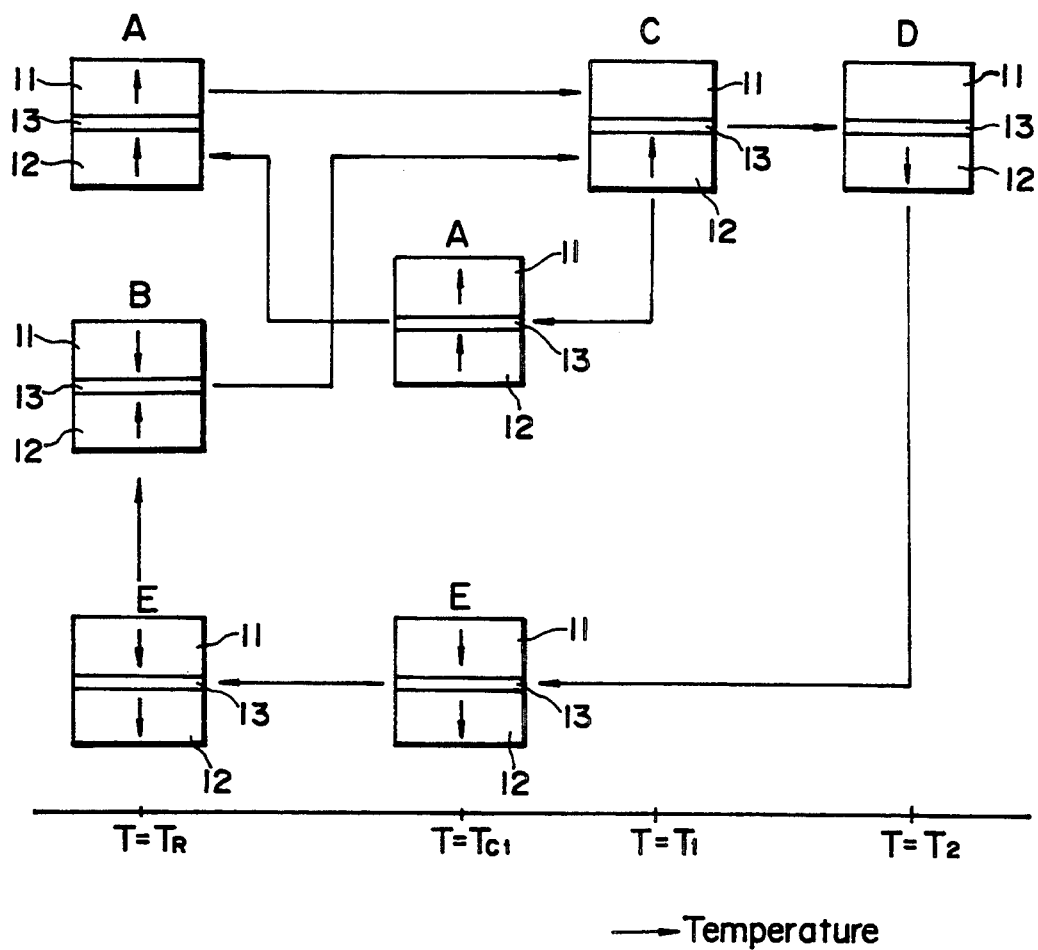
FIGS. 3, 24, and 26 are each a schematic diagram showing states of magnetization in a thermomagnetic recording medium used in a thermomagnetic recording method of the present invention.

In the present invention, recording of information is performed on the recording medium 10 as shown in FIG. 3, in the same way as described with reference to FIG. 1, by heating the laminated film with laser beam irradiation up to the first and second temperatures $T_1$ and $T_2$. More particularly, a first heating condition to raise the temperature to a first temperature $T_1$ virtually above the Curie temperature $T_{C1}$ of the first magnetic thin film 11 and causing no reversal of the magnetic moment in the second magnetic thin film 12 and a second heating condition to raise the temperature to a second temperature $T_2$ above the Curie temperature $T_{C1}$ of the first magnetic thin film 11 and sufficient to reverse the magnetic moment in the second magnetic thin film 12 are modulated in accordance with the information signals to be recorded and the heated positions on the medium are cooled down so that the above described state A and state B are obtained there.

According to the present invention as described above, the recording of information is achieved by bringing about certain states of magnetization in the first and second magnetic thin films 11 and 12. However, by having the third magnetic thin film 13 sandwiched in-between the two films, the domain wall energy $\sigma_W$ between the first and second magnetic thin films 11 and 12 can be controlled and it is thereby made easier to satisfy the above mentioned expressions (2), (3) and (4$_2$).

Figure 1:
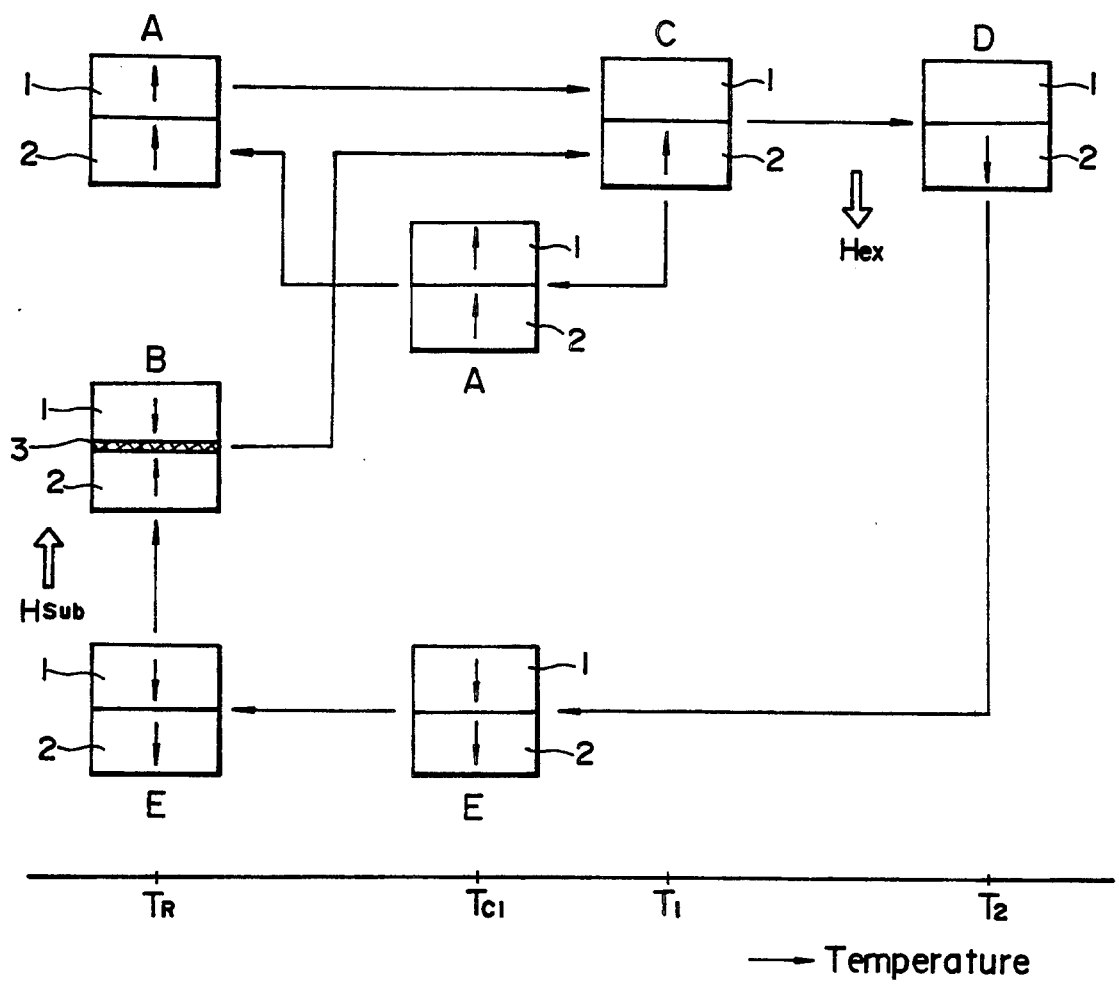
FIG. 1 is a schematic diagram showing states of magnetization in a thermomagnetic recording medium used in a thermomagnetic recording method previously applied by the present applicant.

More particularly, according to the present invention, the states A and B are brought about via the states A–E as shown in FIG. 3, in the same way as described with FIG. 1. That is, the recording of information by the state A in which the first and second magnetic thin films 11 and 12 are magnetized in the same direction and the state B in which they are magnetized in the reverse directions is performed, and at this time, by virtue of existence of the third magnetic thin film 13, the state of formation of the interface domain walls is stabilized, whereby the margin in designing the characteristics of the magnetic thin films are expanded, the domain wall energy is lowered, and the subsidiary external magnetic field required for the transition from the state E to the state B can be decreased.

The thermomagnetic recording medium 10 used in the present invention is formed, as shown in FIG. 2, of a light transmitting substrate 15 of a glass plate, an acrylic plate, or the like provided with a laminated film 14 deposited on one surface thereof, via a transparent dielectric film 16 serving as a protecting film or an interference film, by, for example, continuous sputtering of the first magnetic thin film 11, the third magnetic thin film 13, and the second magnetic thin film 12 in turn, the laminated film being covered with a protection film 17 of a nonmagnetic metallic film or a dielectric film. In the thermomagnetic recording medium 10, however, the dielectric film 16 and the protecting film 17 may be omitted.

Embodiment 1

Figure 4:
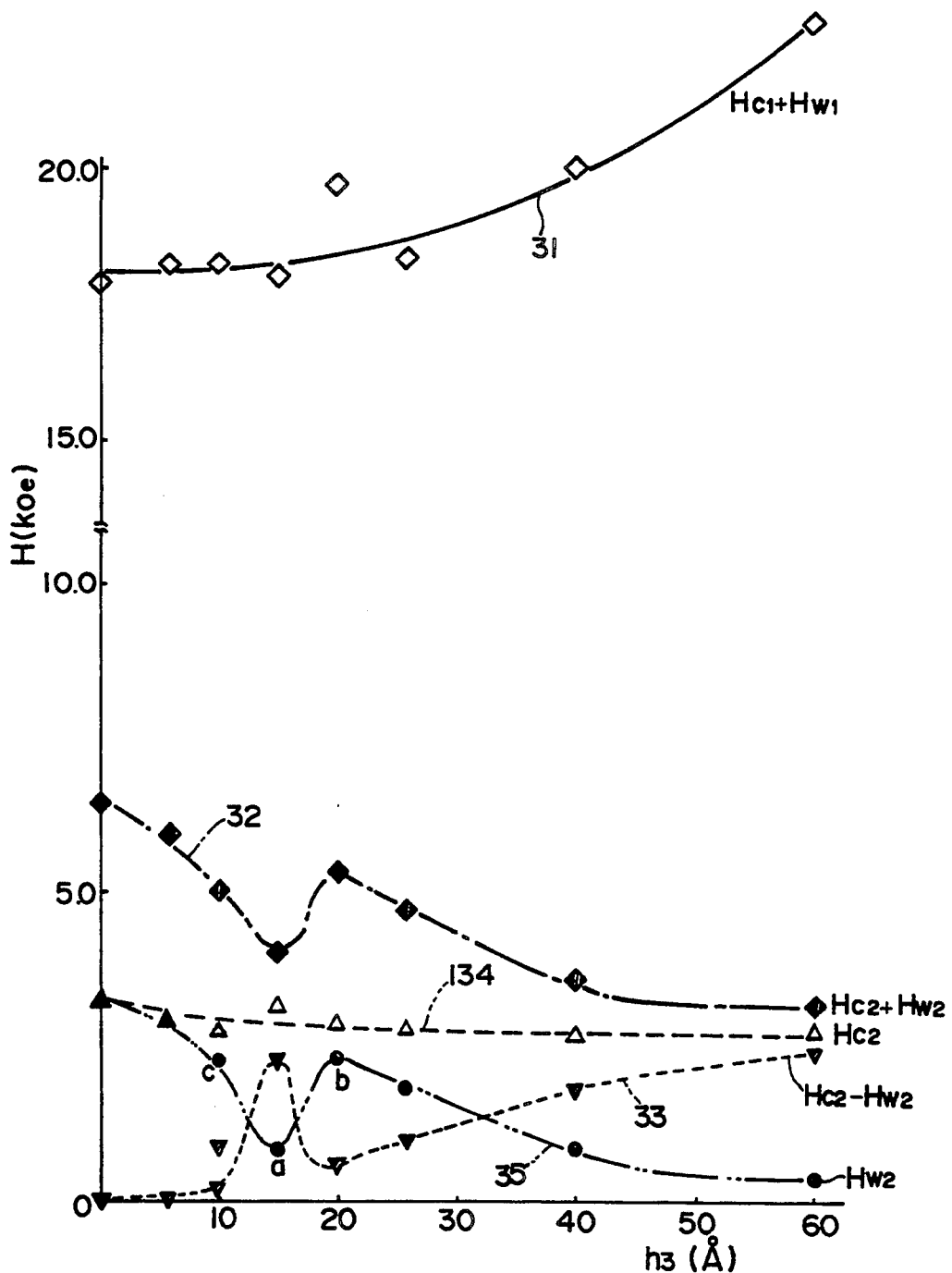
FIGS. 4, 5, 9, and 10 are each a graph showing dependence of characteristics of a thermomagnetic recording medium of the present invention on the thickness of a third magnetic film.

A laminated film 14 is formed of a first magnetic thin film 11 of a rare earth rich film, for example, of Tb(Fe$_{0.95}$Co$_{0.05}$) with a thickness h$_1$=600 Å and M$_{S1}$=60 emu/cc, a third magnetic thin film 13 of Fe$_{0.9}$-$_5$Co$_{0.05}$ with M$_{S3}$=1600 emu/cc, and a second magnetic thin film 12 of a transition metal rich film of Tb(Fe$_{0.9}$-$_5$Co$_{0.05}$) with a thickness h$_2$=600 Å and M$_{S2}$=200 emu/cc, laminated in turn to the adjoining film by continuous sputtering. Here, it is preferred that the third magnetic thin film 13 has a strong in-plane anisotropic property, and its thickness is arranged to be thin when the in-plane anisotropic property (k$_3$<0) is strong and to be thick when it is weak such that $|K_3h_3|$ becomes virtually equal to K$_1$h$_1$, K$_2$h$_2$. The dependence of H$_{W2}$=$\sigma_{W2}$/2M$_{S2}$h$_2$ obtained from a Faraday hysteresis loop of the laminated film 14 structured as described above on the thickness h$_3$ of the third magnetic thin film 13 is shown in FIG. 4.

Figure 5:
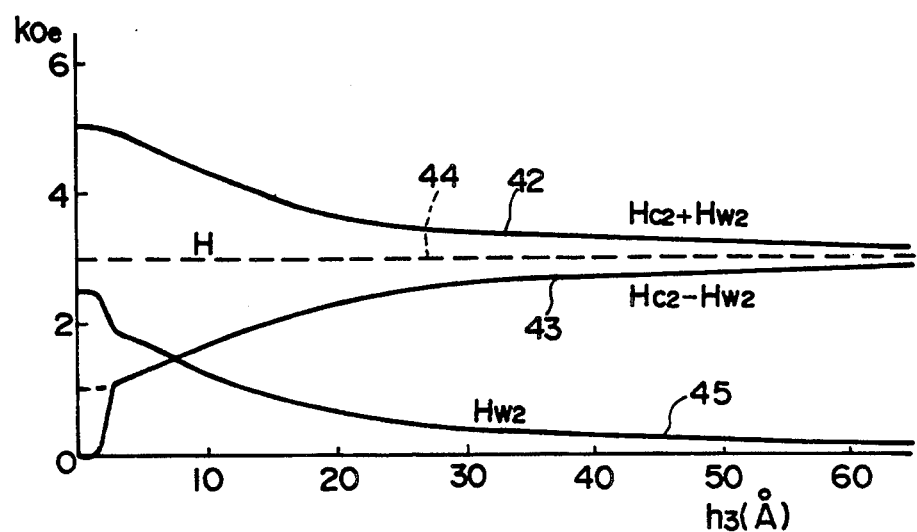
Figure 6:
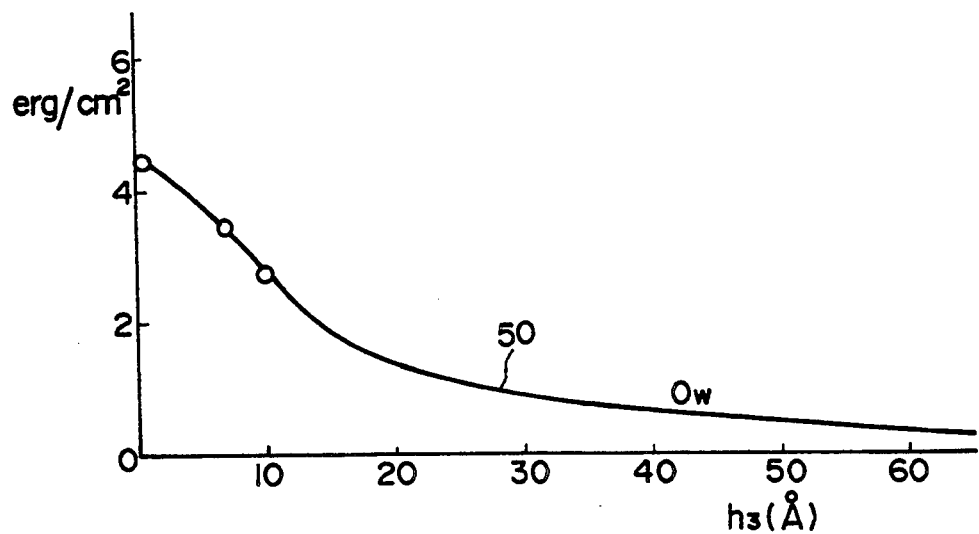
FIGS. 6, 11, and 13 are each a graph showing dependence of magnetic domain wall energy $\sigma_W$ in a thermomagnetic recording medium of the present invention on the thickness of a third magnetic film.

Referring to the figure, curve 31 ( ), curve 32 ( ) and curve 33 ( ), respectively, are results from actual measurements of (H$_{C1}$+H$_{W1}$), (H$_{C2}$+H$_{W2}$), and (H$_{C2}$−H$_{W2}$), while curve 34 (△) and curve 35 ( ) are results calculated from the measurement results. Further, FIG. 5 and FIG. 6 show dependence obtained by computer simulation on the thickness h$_3$ of the third magnetic thin film 13, i.e., referring to FIG. 5, curve 42 indicates dependence of (H$_{C2}$+H$_{W2}$), curve 43 that of (H$_{C2}$−H$_{W2}$), curve 44 that of H$_{C2}$, and curve 45 that of H$_{W2}$ on h$_3$, while curve 50 in FIG. 6 indicates dependence of $\sigma_W$ on h$_3$. In this case, the thicknesses h$_1$ and h$_2$ of the first and second magnetic thin films 1 and 2 are arranged to be 600 Å and characteristic values of the first to third magnetic thin films 1-3 are arranged to be the values as shown in Table 1.

TABLE 1

|   | 1st Magnetic Thin Film | 2nd Magnetic Thin Film | 3rd Magnetic Thin Film |
|---|---|---|---|
| A | 0.3 × 10$^{-6}$ (erg/cm) | 0.3 × 10$^{-6}$ (erg/cm) | 2 × 10$^{-6}$ (erg/cm) |
| K | 6 × 10$^6$ (erg/cm$^3$) | 4 × 10$^6$ (erg/cm$^3$) | −20 × 10$^6$ (erg/cm$^3$) |
| M$_S$ | −40 (emu/cm$^3$) | 180 (emu/cm$^3$) | 1800 (emu/cm$^3$) |

Here, the minus sign of M$_S$ indicates that the first magnetic thin film 11 is a rare earth rich film.

The results of computer simulation shown in FIG. 5 and FIG. 6 are in good agreement with the results of actual measurement in FIG. 4, and it is known that $\sigma_W$ and hence H$_{W2}$ can be controlled by the third magnetic thin film h$_3$. If the thickness of the third magnetic thin film is selected to be about h$_3$=15 Å whereby H$_{W2}$ is minimized, since H$_{W2}$ is small at room temperature, it becomes easier to satisfy the expression (4$_2$). If the temperature is raised after making H$_{sub}$ small, the operating point goes off the minimum point and $\sigma_W$ becomes relatively larger and it becomes easier to satisfy the expression (5).

If the composition is selected to correspond to the position where H$_{W2}$ and hence $\sigma_W$ exhibits a trough at room temperature (point a) in the characteristic of FIG. 4, then, since the temperature characteristics of the perpendicular anisotropy, magnetization, and others with the increase in the temperature differ with the first to third magnetic thin films 11-13, it can be expected that $\sigma_W$ deviates from the minimum point relative to the film thickness h$_3$ and moves to the point b or point c in FIG. 4 and the increase of $\sigma_W$, or at least decrease of $\sigma_W$, with increase in the temperature becomes gentle. Thus, at the temperature T≈T$_{C1}$−δ close to T$_{C1}$, it becomes easier to attain H$_{W1}$−H$_{C1}$>H$_{ex}$.

Embodiment 2

Figure 7:
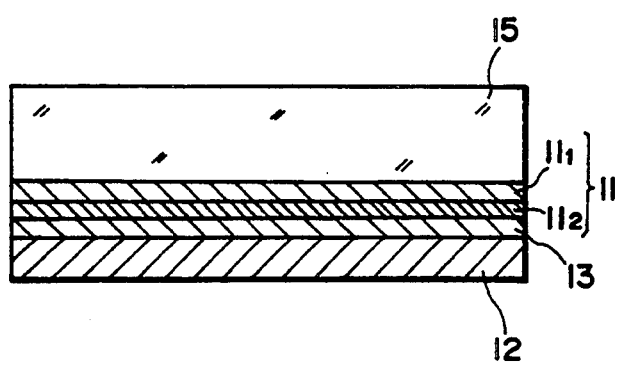

In this embodiment, to avoid that the expression (5) becomes unsatisfiable by lowering of $\sigma_W$ at room temperature, the first magnetic thin film 11 is formed, as shown in FIG. 7, of two layers of magnetic thin films, first and second component films 11$_1$ and 11$_2$. In this case, the first component film 11$_1$ is made of a magnetic thin film, for example, of TbFe magnetic film whose Curie temperature T$_{C11}$ is 130° C. and the second component film 11$_2$, the layer lying thereunder, is made of Tb(Fe$_{0.95}$Co$_{0.05}$) whose Curie temperature T$_{C12}$ is approximately 160° C. Further, the third magnetic thin film 13 is made, for example, of FeCo, while the second magnetic thin film 12 is made of a magnetic thin film of GdTbFeCo whose Curie temperature T$_{C2}$ is about 220° C. According to the described structure, the above expression (5) will be superseded by $$\sigma_W/2M_{S1} \cdot h_{12} = H_{W1}' > H_{C1} + H_{ext} \tag{5a}$$

Namely, in this case, the film thickness of the first layer apparently becomes thinner from h$_1$ to h$_{12}$, and thus, the expression (5a) becomes easier to satisfy than the expression (5).

Embodiment 3

Figure 8:
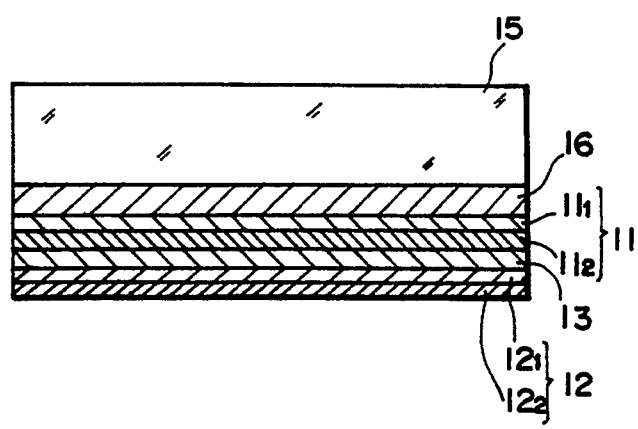

On a transparent glass substrate 15 provided with guide grooves by the well-known so-called 2P method (Photo Polymerization) is deposited a transparent dielectric film 16 made of Si$_3$N$_4$ as shown in FIG. 8. Over the same, first and second component films 11$_1$ and 11$_2$ constituting a first magnetic thin film 11, a third magnetic thin film 13, and first and second component films 12$_1$ and 12$_2$ constituting a second magnetic thin film 12 are deposited in turn. Composition and characteristics of these magnetic thin films are shown in Table 2.

TABLE 2

| Magnetic Thin Film | Composition | Curie Point (°C.) | Compensation Temp. (°C.) | Magnetization (emu/cc) | Film Thickness (Å) |
|---|---|---|---|---|---|
| 1st Magnetic Thin Film | | | | | |
| 1st C. F. 11$_1$ | TbFe | 140 | 120 | 50 | 300 |
| 2nd C. F. 11$_2$ | TbFeCo | 152 | 120 | 60 | 220 |
| 3rd Magnetic | GdFeCo | 240 | — | 400 | 100 |

TABLE 2-continued

| Magnetic Thin Film | Composition | Curie Point (°C.) | Compensation Temp. (°C.) | Magnetization (emu/cc) | Film Thickness (Å) |
|---|---|---|---|---|---|
| Thin Film 13 2nd Magnetic Thin Film | | | | | |
| 1st C. F. $12_1$ | GdTbFeCo | 240 | 185 | 125 | 500 |
| 2nd C. F. $12_2$ | GdFeCo | 250 | 180 | 125 | 400 |

With the thermomagnetic recording medium 10 of the described structure, it is considered that domain walls are formed in the vicinity of the third magnetic thin film 13 at room temperature. By providing the third magnetic thin film 13, the interface domain wall energy $\sigma_W$ on the interface between the second component film $11_2$ of the first magnetic thin film 11 and the first component film $12_1$ of the second magnetic thin film 12 became 1.5 erg/cm$^2$, and the subsidiary external magnetic field $H_{sub}$ necessary for reversing the magnetization in the third magnetic thin film 13 and the first component film $12_1$ of the second magnetic thin film 12 at room temperature became 2.5 kOe. The magnetic anisotropy constant $K_3 = -1.0 \times 10^6$ erg/cm$^3$ indicates its in-plane anisotropy. In the case without the use of the third magnetic thin film 13, $\sigma_W$ becomes 2.8 erg/cm$^2$ and the condition for enabling the overwrite cannot be satisfied unless the first component film $12_1$ of the second magnetic thin film 12 is made as thick as 1000 Å. Besides, even if the film is selected to be so thick, the subsidiary external magnetic field $H_{sub}$ is required to be as high as 3.5 kOe, from which it is known that reduction in the subsidiary external magnetic field can be attained by the embodiment 3.

The recording characteristics of the disk A provided by using the thermomagnetic recording medium formed according to the embodiment 3 were evaluated and these characteristics are shown in Table 3. The measurement results are that obtained from the record made at a linear speed of 10 m/sec, and C/N indicates the value at the time of overwriting. In Table 3, there are also shown a disk B, in which a third magnetic thin film 13 as shown in the above Table 2 is not used and a second magnetic thin film formed of the material of the First component film $12_1$ in a single layer having a thickness of 1000 Å is used, and a disk C, in which the first magnetic thin film is not formed of the first and second component films $11_1$ and $11_2$, but formed of a single layer having a thickness of 550 Å made of the material of the first component film $11_1$.

TABLE 3

| | Disk A | Disk B | Disk C |
|---|---|---|---|
| Optimum Recording Power (mw) | 9.3 | 10.8 | 9.1 |
| C/N (f = 2 MHz) (db) | 56.0 | 55.2 | 53.2 |
| External Magnetic Field for Optimum Recording (Oe) | 300–850 | 300–850 | 300–350 |
| Subsidiary Magnetic Field $H_{sub}$ (kOe) | 2.5 | 3.5 | 2.5 |
| Ambient Temp. for Preserving Record (°C.) (under Zero Magnetic Field) | <80° C. | <55° C. | <70° C. |

As apparent from Table 3, the subsidiary external magnetic field $H_{sub}$ can be lowered by providing the third magnetic thin film 13 and the ambient temperature for preserving the record can be raised. Further, it is known that C/N can be improved, with the subsidiary external magnetic field $H_{sub}$ and the recording power kept constant, by forming the first magnetic thin film 11 into a two-layer structure, the layers thereof having different Curie points. Namely, C/N is improved due to the fact that the conditional expression (5a) is completely satisfied and the range of the ambient temperature for stabilized reservation of the record can be expanded due to the fact that the above described expressions (2) and (3) are satisfied more easily.

Embodiment 4

Figure 9:
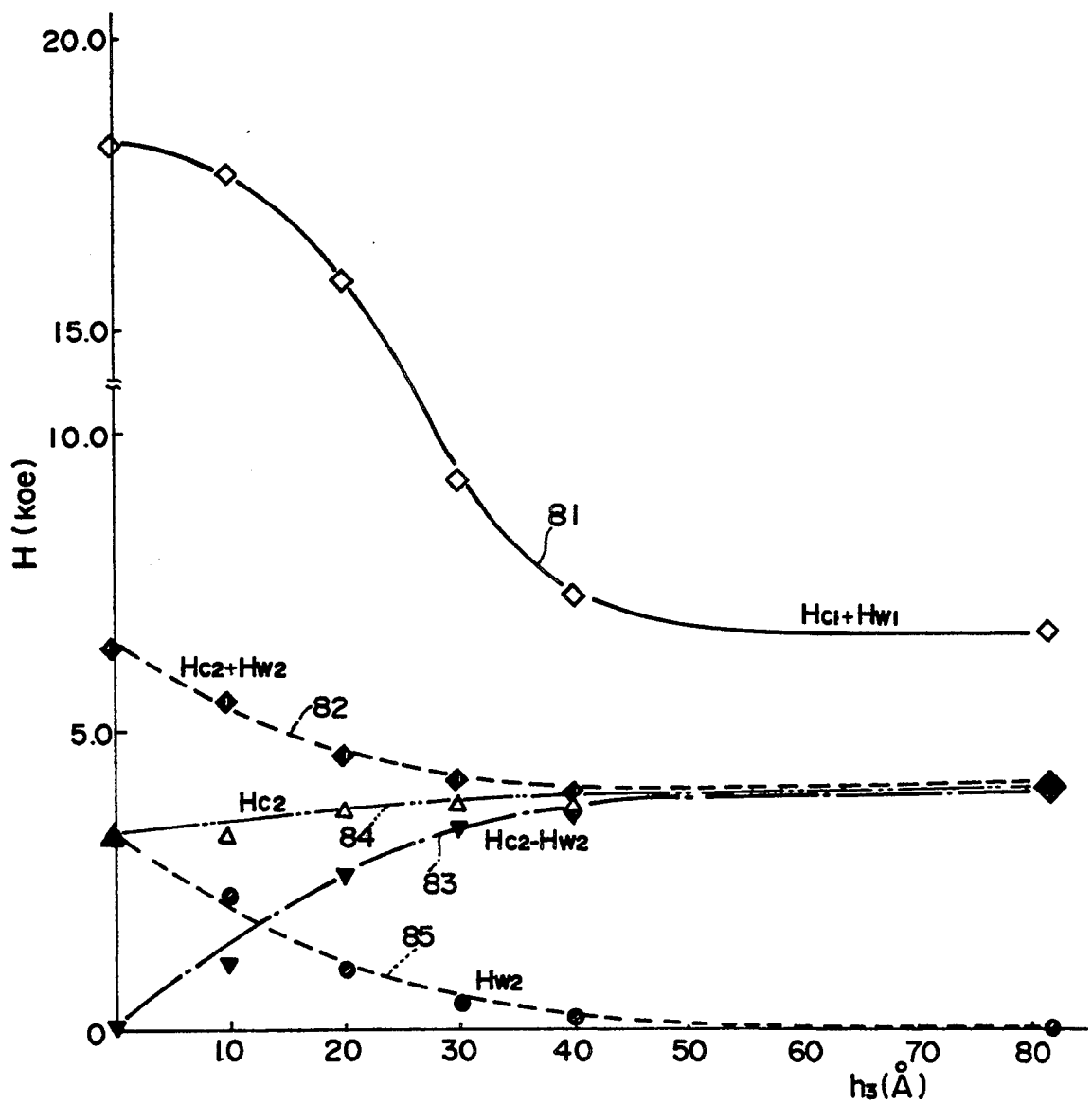
Figure 10:
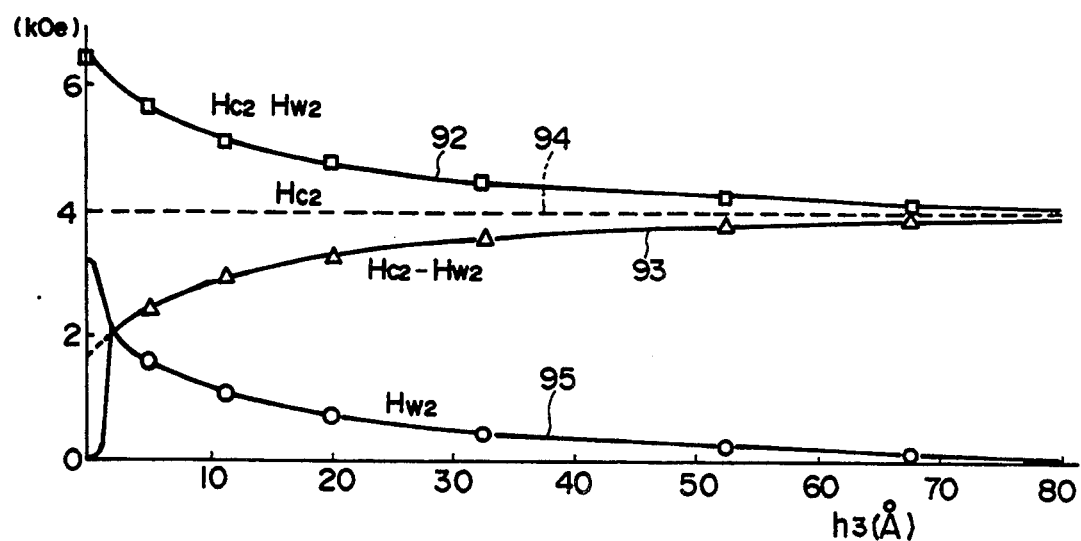
Figure 11:
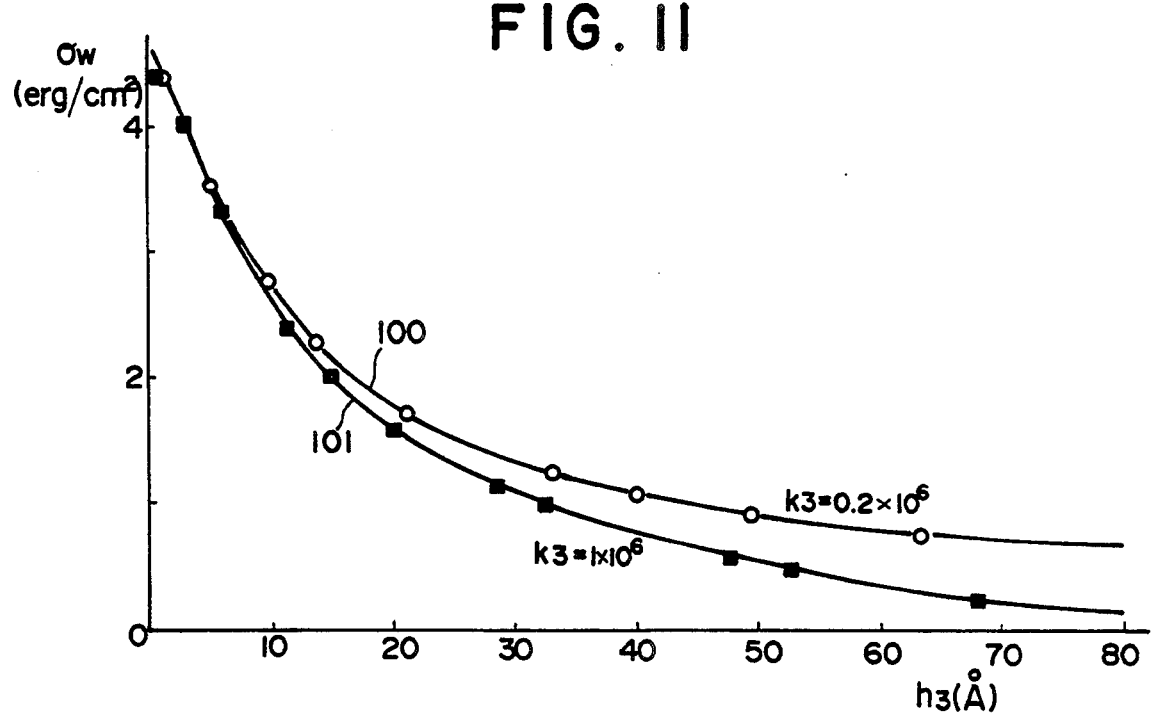

Over a transparent substrate 15 of a glass substrate, a first magnetic thin film 11 of a rare earth rich Tb(Fe$_{0.95}$Co$_{0.05}$) film having a thickness of $h_1 = 600$ Å and saturation magnetization $M_{S1} = 60$ emu/cm$^3$, a third magnetic thin film 13 of a similarly rare earth rich Tb(Fe$_{0.95}$Co$_{0.05}$) film having saturation magnetization $M_{S3} = 200$ emu/cm$^3$, and a second magnetic thin film 12 of a transition metal rich Tb(Fe$_{0.95}$Co$_{0.05}$) film having a thickness of $h_2 = 600$ Å and saturation magnetization $M_{S2} = 200$ emu/cm$^3$ are deposited in turn by sputtering and the thus prepared thermomagnetic recording medium 10 was used. Results of measurement of dependence in this case of $H_{W2} = \sigma_W/2M_{S2}h_2$ on the thickness $h_3$ of the third magnetic thin film 13 are shown in FIG. 9. In the figure, curve 81 ( ), curve 82 ( ), and curve 83 ( ) are results of actual measurement of ($H_{C1} + H_{W1}$), ($H_{C2} + H_{W2}$), and ($H_{C2} - H_{W2}$), respectively, and curve 84 (Δ) and curve 85 ( ) are results calculated from the measurement results. FIG. 10 and FIG. 11 show dependence on the thickness $h_3$ of the third magnetic thin film 13 obtained by computer simulation, namely, in FIG. 10, curve 92 shows dependence on $h_3$ of ($H_{C2} + H_{W2}$), curve 93 shows that of ($H_{C2} - H_{W2}$), curve 94 shows that of $H_{C2}$, and curve 95 shows that of $H_{W2}$. The computer simulation was carried out with a measured value of $K_3 = -1.0 \times 10^6$ erg/cm$^3$. In FIG. 11, curves 100 and 101 show dependence of $\sigma_W$ on $h_3$ when the anisotropy constant $K_3$ of the third magnetic thin film 13 was set to $K_3 = 0.2 \times 10^{-6}$ (emu/cm$^3$) and $K_3 = -1 \times 10^{-6}$ (emu/cm$^3$), respectively. In this case, the thicknesses $h_1$ and $h_2$ of the first and second magnetic thin films 11 and 12 were set to 600 Å and characteristics of the first to third magnetic thin films 11-13 were set to be as shown in Table 4.

TABLE 4

| | First Magnetic Thin Film 11 | Second Magnetic Thin Film 12 | Third Magnetic Thin Film 13 |
|---|---|---|---|
| A | $0.3 \times 10^{-6}$ (erg/cm) | $0.3 \times 10^{-6}$ (erg/cm) | $0.05 \times 10^{-6}$ (erg/cm) |
| K | $6 \times 10^{-6}$ (erg/cm$^3$) | $4 \times 10^{-6}$ (erg/cm$^3$) | $0.2 \times 10^6$ (erg/cm$^3$) $-1 \times 10^6$ (erg/cm$^3$) |
| $M_S$ | $-40$ (emu/cm$^3$) | 180 (emu/cm$^3$) | $-200$ (emu/cm$^3$) |
| $H_C$ | 18 (kOe) | 4 (kOe) | 0.2 (kOe) |

According to the above results, it is known that $\sigma_W$ and hence $H_{W2}$ can be controlled even if the third magnetic thin film 13 is that having weak perpendicular anisotropy.

Figure 12:
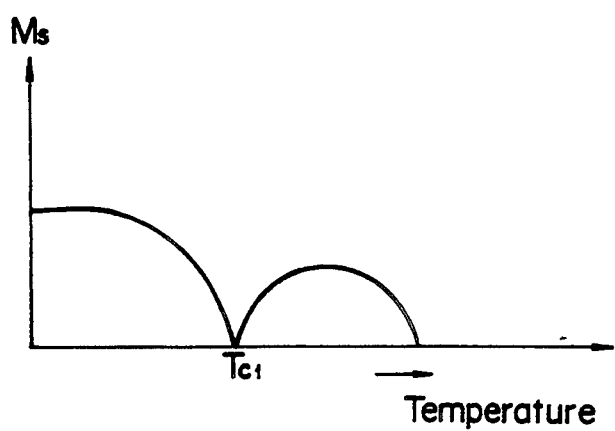
FIG. 12 is a graph showing a magnetization-temperature characteristic of an example of a third magnetic film.

Further, as the third magnetic thin film 13, that having large saturation magnetization $M_S$ at room temperature and having small $M_S$ at the temperature T in the vicinity of $T_{C1}$, namely, such a magnetic thin film having a compensation temperature characteristic near there as shown in FIG. 12 may be used. Since $K = K_u - 2\pi M_s^2$, $\sigma_W \approx 4\sqrt{AK}$, where $K_u$ is a uniaxial anisotropic constant, $\sigma_W$ becomes small when $M_s$ is large, and $\sigma_W$ becomes large when $M_s$ is small.

Then, it becomes possible to provide a recording medium of which the temperature characteristic of $\sigma_W$ is small at room temperature and it becomes relatively larger at the temperature T in the vicinity of $T_{C1}$.

In the present invention, between a first magnetic thin film 11 and a second magnetic thin film 12 is interposed a third magnetic thin film 13 having in-plane anisotropy or weak perpendicular anisotropy, so that stabilization of magnetic domain walls is achieved. Thereby, stabilized and positive recording, recording with high C/N, can be achieved.

By achieved reduction of the magnetic domain wall energy $\sigma_W$ at room temperature, reduction in the subsidiary external magnetic field $H_{sub}$ and hence simplification of the apparatus is achieved.

Further, by reduction of a $\sigma_W$, the range within which the above described expressions (3) and (6) are satisfied can be expanded. Further, when the first magnetic thin film is formed into a two-layer structure as described above, the conditional expression (5) is superseded by the expression (5a), and thereby, the range within which the condition is satisfied is expanded and allowance for the design can be enlarged.

While in the aforementioned example, the lowering of the subsidiary magnetic field has been achieved by improving characteristics at room temperature, that is, by stabilizing magnetic domain walls and decreasing domain wall energy at room temperature, an example which adds the above method a function to provide sufficient domain wall energy in the vicinity of the Curie temperature $T_{C1}$ of the first magnetic thin film, so that the process for the magnetization in the transition metal of the first magnetic thin film 1 to be aligned with the magnetization in the transition metal of the second magnetic thin film 2 described in FIG. 1, that is, the transition from the state C to the state A, or the transition from the state D to the state E, may be positively performed will be described.

In the following example, a thermomagnetic recording medium 10 as shown in FIG. 2 is used, but the third magnetic thin film 13 is formed of a magnetic thin film of a rare earth rich metallic film, effective magnetic anisotropic constant K of which exhibits a temperature characteristic being convex upward or linear, and the saturation magnetization $M_S$ of which at room temperature is 0 to 450 emu/cm³.

Recording of information is performed on the recording medium 10 as shown in FIG. 3, in the same way as described with reference to FIG. 1, by heating the laminated film with laser beam irradiation up to the first and second temperatures $T_1$ and $T_2$. More particularly, a first heating condition to raise the temperature to a first temperature $T_1$ virtually above the Curie temperature $T_{C1}$ of the first magnetic thin film 11 and causing no reversal of the magnetic moment in the second magnetic thin film 12 and a second heating condition to raise the temperature to a second temperature $T_2$ above the Curie temperature $T_{C1}$ of the first magnetic thin film 11 and sufficient to reverse the magnetic moment in the second magnetic thin film 12 are modulated in accordance with the information signals to be recorded and the heated positions on the medium are cooled down so that records by magnetization are obtained there.

With described arrangement, the recording of information is achieved by bringing about certain states of magnetization in the first and second magnetic thin films 11 and 12. However, by having the third magnetic thin film 13 sandwiched in-between the two films, the domain wall energy $\sigma_W$ between the first and second magnetic thin films 11 and 12 can be controlled and it is thereby made easier to satisfy the above mentioned expressions (5) and (6).

More particularly, in the present example, the states A and B are brought about via the states A–E as shown in FIG. 3, in the same way as described with FIG. 11. That is, the recording of information by the state A in which the first and second magnetic thin films 11 and 12 are magnetized in the same direction and the state B in which they are magnetized in the reverse directions is performed, and by virtue of existence of the third magnetic thin film 13 at this time, the state of formation of the interface domain walls can be stabilized in the vicinity of room temperature, whereby the margin in designing the characteristics of the magnetic thin films are expanded, the domain wall energy is lowered, and the subsidiary external magnetic field required for the transition from the state E to the state B can be decreased.

Further, it is adapted such that sufficient domain wall energy is provided in the vicinity of the Curie temperature $T_{C1}$, i.e., at a high temperature, so that the process in which the magnetization in the transition metal of the first magnetic thin film 11 is aligned with the magnetization in the second magnetic thin film 12, namely, the transition from the state C to the state A, or the transition from the state D to the state E in FIG. 3, are performed accurately.

The third magnetic thin film 13 can be selected to be a thin film, for example, of composition of GdFeCo group whose saturation magnetization $M_S$ at room temperature is such that $0 \leq M_S \leq 450$ emu/cm³, or to be concrete, it is selected to be of composition of $Gd_x(Fe_{1-y}Co_y)_{1-x}$, where $0.25 \leq x \leq 0.40$, $0 \leq y \leq 1.0$ (x, y being atomic ratio). In this case, other rare earth elements such as Dy, Tb, Nd may be added to GdFeCo used as the basic composition.

First, relationship between the effective magnetic anisotropic constant K of the third magnetic thin film and the domain wall energy $\sigma_W$ will be described.

Figure 13:
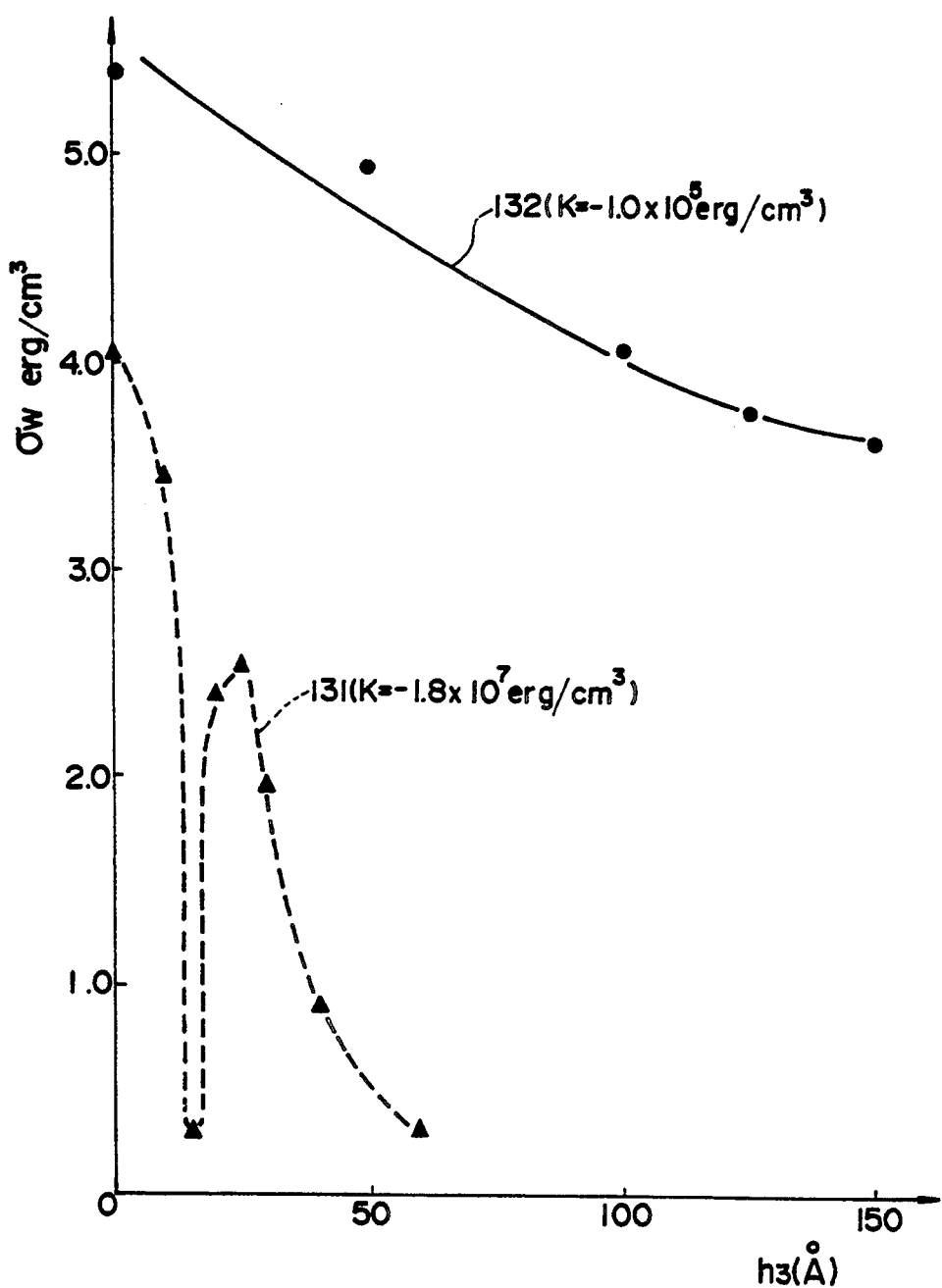

In FIG. 13 are plotted, by ○ and •, measurement results of relationship of the domain wall energy $\sigma_W$ of each of $Fe_{0.95}Co_{0.05}$ and $Gd(Fe_{0.95}Co_{0.05})$, the effective magnetic anisotropic constant K of the former ($K = -1.8 \times 10^7$ erg/cm³) being relatively larger than that of the latter ($K = -1.0 \times 10^5$ erg/cm³), against the film thickness $h_3$ of the intermediate film. As apparent from comparison of the thus obtained curves 131 and 132, the larger the in-plane anisotropy, the smaller the domain wall energy $\sigma_W$ and the greater the descent thereof with increase in the film thickness $h_3$. From this, it follows that the domain wall energy $\sigma_W$, when a film has a large amount of in-plane anisotropy at room temperature and has a small amount of in-plane anisotropy or an amount of perpendicular anisotropy at high temperatures (in the vicinity of the Curie temperature $T_{C1}$), becomes small at room temperature and becomes large in the vicinity of $T_{C1}$. Here, it is ideal that the in-plane anisotropy is large at room temperature as described above, but even if a film has a perpendicular anisotropy at room temperature, the domain wall energy $\sigma_W$ can be kept low if the perpendicular anisotropy is of a small value.

The effective magnetic anisotropic constant K is that determined by $$K = K_U - 2\pi M_S^2 \qquad (7)$$

($K_U$ is the uniaxial anisotropic constant), and the temperature characteristic is dependent on the temperature characteristics of $K_U$ and $M_S$, of which the temperature characteristic of $K_U$ is monotone decreasing.

Figure 14:
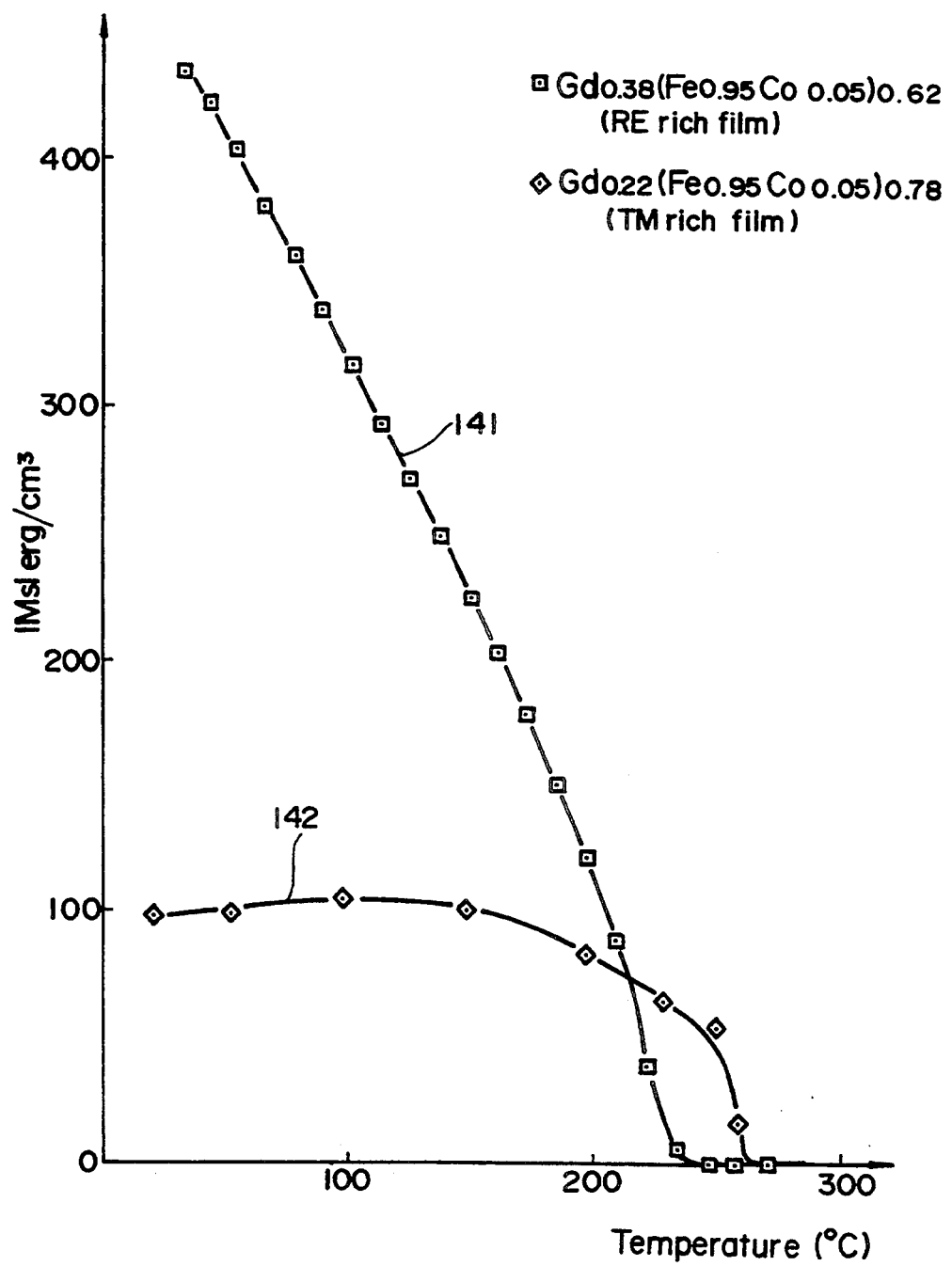
FIG. 14 is a graph showing temperature dependence of saturation magnetization.

In FIG. 14 are shown measurement results of the temperature characteristic of the saturation magnetization $M_S$ with the use of a vibrating sample magnetometer (VSM). Referring to the figure, the curve plotted by     is the measurement result of $|M_S|$ of a rare earth rich film (hereinafter to be called "RE rich film") of the composition of $Gd_{0.38}(Fe_{0.95}Co_{0.05})_{0.62}$ and the curve plotted by     is that of a transition metal rich film (hereinafter to be called "TM rich film") of the composition of $Gd_{0.22}(Fe_{0.95}Co_{0.05})_{0.78}$.

From the curves 141 and 142 representing the measurement results, it is apparent, in the case of the TM rich curve 142, that the value $M_S$ at the same level as at room temperature is obtained at temperatures up to the vicinity of the Curie temperature $T_C$. From this it follows that a composition having large in-plane anisotropy at room temperature will have large in-plane anisotropy even at high temperatures, i.e., in the vicinity of the Curie temperature $T_{C1}$ of the first magnetic thin film 11. Meanwhile, in the case of the RE rich curve 141, the value $|M_S|$ decreases with increase in the temperature, and hence, even if a composition has in-plane anisotropy at room temperature, it will have sufficiently small amount of in-plane anisotropy or perpendicular anisotropy in the vicinity of $T_{C1}$.

Figure 15:
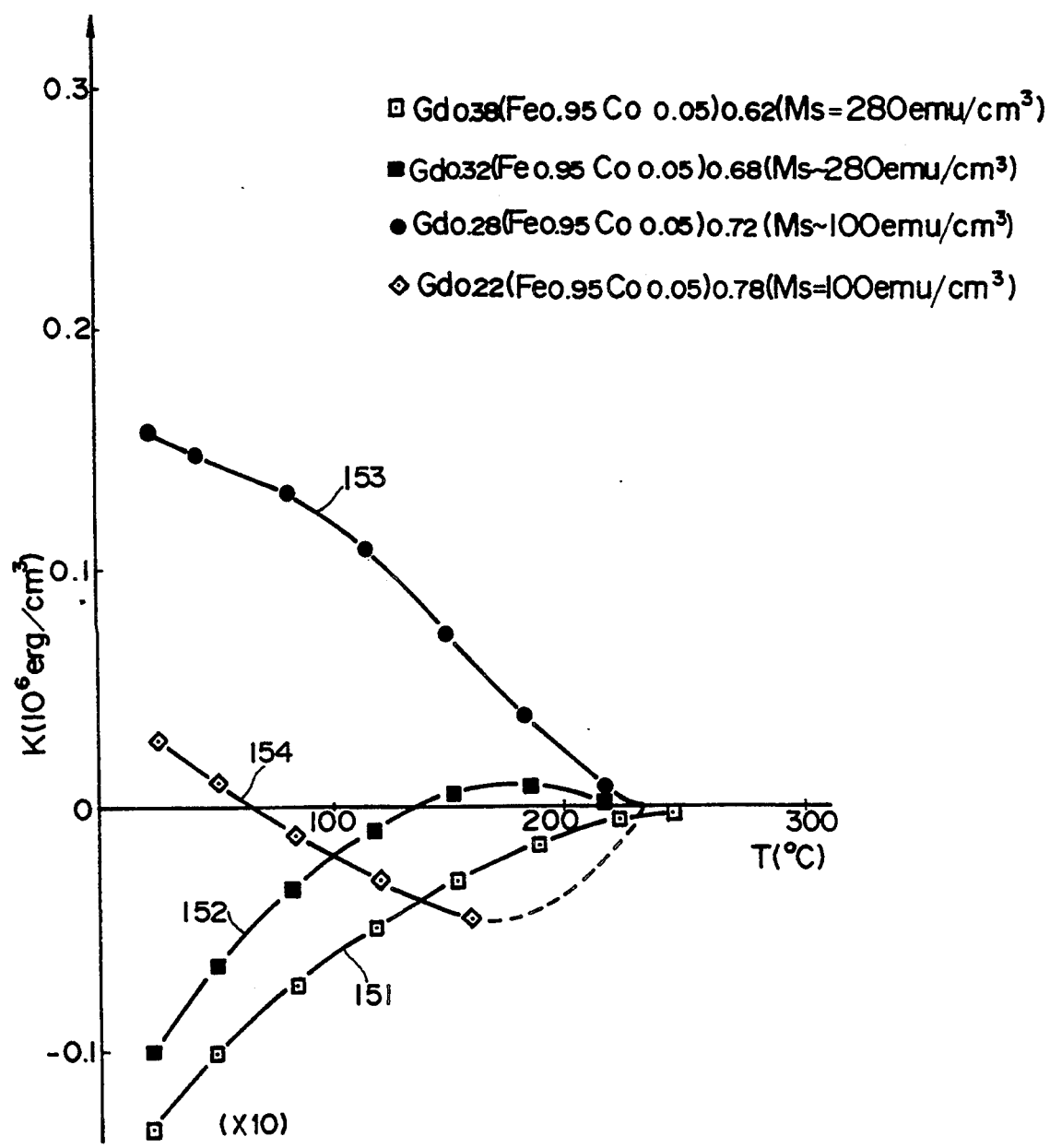
FIG. 15 is a graph showing temperature dependence of effective perpendicular anisotropy constant.

Further, FIG. 15 shows measurement results of dependence on temperature of the effective magnetic anisotropic constant K of $Gd(Fe_{0.95}Co_{0.05})$ obtained with the use of a magnetic torque meter. Referring to the figure, curve 151 ( ) represents $Gd_{0.38}(Fe_{0.95}Co_{0.05})_{0.62}$ whose $M_S$ at room temperature is approximately 440 emu/cm³, curve 152 ( ) represents $Gd_{0.32}(Fe_{0.95}Co_{0.05})_{0.68}$ whose $M_S$ at room temperature is approximately 280 emu/cm³, curve 153 ( ) represents $Gd_{0.28}(Fe_{0.95}Co_{0.05})_{0.72}$ whose $M_S$ at room temperature is 100 emu/cm³, and curve 154 ( ) represents $Gd_{0.22}(Fe_{0.95}Co_{0.05})_{0.78}$ whose $M_S$ at room temperature is 100 emu/cm³. Here, values of K plotted by     are 10 times the values indicated along the axis of ordinate of FIG. 15. As apparent from the temperature characteristics 151–154 of K obtained from the measurement results, the RE rich film represented by the curve 152 indicates the most preferable characteristics exhibiting in-plane magnetic anisotropy at room temperature but exhibiting perpendicular magnetic anisotropy in the vicinity of the Curie temperature. The curve 151 exhibits sufficiently great in-plane magnetic anisotropy at room temperature and exhibits small in-plane magnetic anisotropy in the vicinity of the Curie temperature, which is also a preferable characteristic. Further, the curve 153 exhibits perpendicular magnetic anisotropy at room temperature but it is of a small amount and exhibits smaller perpendicular magnetic anisotropy in the vicinity of the Curie temperature, but this composition may sometimes be used if the characteristic at room temperature in question is compensated for by selection of materials and thicknesses of the first and second magnetic thin films 11 and 12, or the like. As to the curve 154, however, this curve shows a characteristic not only exhibiting perpendicular magnetic anisotropy at room temperature but also exhibiting in-plane magnetic anisotropy in the vicinity of the Curie temperature, a characteristic contrary to that desired.

Figure 16:
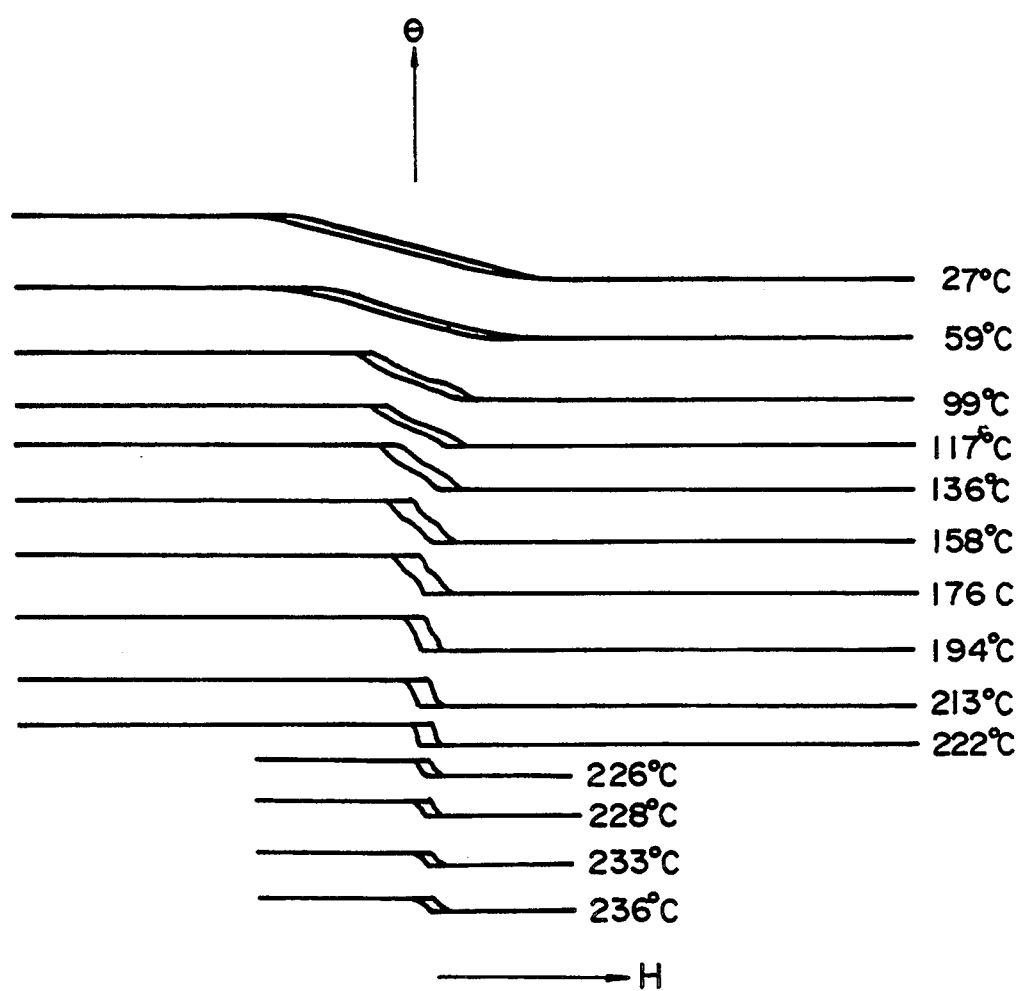
FIG. 16 is a drawing showing Kerr loops changing with temperature in one example of a third magnetic thin film.

In FIG. 16 are shown measurement results of the Kerr loop (angle of Kerr rotation θ-magnetic field H curve) for the the magnetic thin film showing the characteristic of the curve 152 in FIG. 15 at various temperatures.

In view of the above described measurement results, desired composition of the third magnetic thin film 13, for example, in $Gd_x(Fe_{1-y}Co)_{1-x}$ is given by $0.25 \leq X \leq 0.40$, $0 \leq y \leq 1.0$, and the value $M_S$ is desired to be $0 \leq M_S \leq 450$ emu/cm³.

Embodiment 5

A disk was made of a polycarbonate substrate with a first magnetic thin film 11 of TbFeCo having a thickness of 400 Å, a third magnetic thin film 13 of $Gd(Fe_{0.95}Co_{0.05})$ having a thickness of 150 Å and saturation magnetization $M_S = 280$ emu/cm³ at room temperature, and a second magnetic thin film 12 of (GdTb)(FeCo) having a thickness of 650 Å deposited thereon by sputtering. With the use of this disk, i.e., thermomagnetic recording medium, thermomagnetic recording with a semiconductor laser beam in the manner as described with reference to FIG. 3, and reading the record with a similar laser beam by virtue of the Kerr effect were carried out.

At this time, the power $P_L$ for writing, for example, a "0" by obtaining the state A via the state C was set to 3.5 mW, the power $P_H$ for writing, for example, a "1" by obtaining the state B via the state D was set to 11 mW, and the power $P_{Read}$ for reading was set to 1.5 mW. Further, at this time, the external magnetic field $H_{ex}$ was set to 400 Oe, the subsidiary external magnetic field $H_{sub}$ to approximately 3.5 kOe, the linear speed to approximately 10 m/sec, and the bit length to approximately 2.5 μm.

Under the above described conditions, a 2 MHz signal was recorded over a record of a 3 MHz signal previously made. As the result, the level of the previous 3 MHz signal was lowered virtually to that of noises and the overwriting was attained with the C/N being approximately 47 dB. At this time, the subsidiary external magnetic field $H_{sub}$ required by the medium was as low as just above 3.5 kOe. Further, the total thickness of the laminated film of the first to third magnetic thin films 11 to 13 could be made as small as 1200 Å.

Reference Example 1

A recording medium was made first depositing a dielectric film of $Si_3N_4$ on a polycarbonate substrate and then depositing thereon a first magnetic thin film 11 of TbFeCo with a thickness of 400 Å, a third magnetic thin film 13 of an RE rich film ($M_S \approx 600$ emu/cm³) of $Gd(Fe_{0.95}Co_{0.05})$ with a thickness of 50 Å, and a second magnetic thin film 12 of $(Gd_{0.8}Tb_{0.2})(Fe_{0.8}Co_{0.2})$ with a thickness of 650 Å in turn. First, a 3 MHz signal was recorded therein and then a 3.5 MHz signal was overwritten. Relationships between the signal levels and the recording magnetic field (external magnetic field $H_{ex}$) used at that time are shown in Table 5.

TABLE 5

| Hex (Oe) | Signal Levels | |
|---|---|---|
|  | 3.5 MHz (dB) | 3.0 MHz (dB) |
| 100 | 29.4 | 6.5 |
| 200 | 33.2 | 11.2 |
| 300 | 25.2 | 15.2 |

TABLE 5-continued

| Hex (Oe) | Signal Levels | |
|---|---|---|
| | 3.5 MHz (dB) | 3.0 MHz (dB) |
| 400 | 24.9 | 17.3 |

Although it is desired at this time that the 3.5 MHz signal becomes large and the 3 MHz signal becomes small, this medium has not exhibited good values for either signal.

Figure 17:
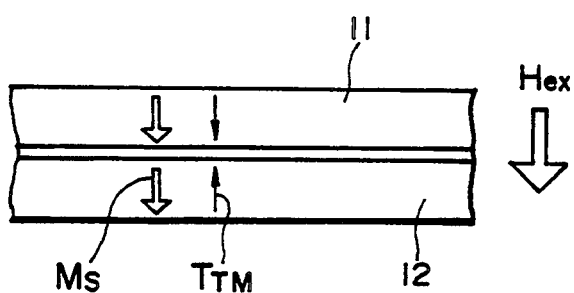
FIG. 17 is an explanatory drawing of a state of magnetization in a reference example.

Further, the 3.0 MHz signal has increased with increase in the Field $H_{ex}$. As the reason for it, the following consideration may be made. In FIG. 17 are shown the total magnetization and the magnetization in the transition metal of the first and second magnetic thin films 11 and 12 in the vicinity of the Curie temperature $T_{C1}$ of the first magnetic thin film and the external magnetic field (recording field) $H_{ex}$ respectively indicated by white arrows and black arrows drawn within the magnetic thin films 11 and 12 and by a white arrow drawn at the right-hand side of the magnetic thin films 11 and 12. Since the recording field is applied at this time in the direction preventing the magnetization in the first magnetic thin film 11 from reversing, the reversal in the first magnetic thin film 11 does not take place unless the exchange force at this temperature is sufficient, namely, the above described expression (5), $H_{W1} > H_{C1} + H_{ex}$, is satisfied. Under these conditions, the conditional expression (5) is satisfied more easily when $H_{ex}$ is low, and thereby, the 3 MHz signal is decreased, but when $H_{ex}$ is high, it is increased. When such an extreme RE rich film is used as the intermediate magnetic thin film, i.e., the third magnetic thin film 13, a sufficient exchange force is not obtained in the vicinity of the Curie temperature $T_{C1}$ of the first magnetic thin film 11, so that such an arrangement becomes unsuitable for light-intensity-modulated overwriting.

Accordingly, the freedom of selection of characteristics is increased by the arrangement of the third magnetic thin film 13 interposed between the first and second magnetic thin films 11 and 12. Especially, since it is arranged such that the effect to decrease the domain energy in the vicinity of room temperature and increase it in the vicinity of the Curie point can be obtained, stabilization of magnetic domain walls at room temperature is achieved and thereby reduction of the subsidiary external magnetic field $H_{sub}$ and hence simplification of the apparatus can be attained. By making high domain wall energy obtainable in the vicinity of the Curie point, it is made possible to perform writing into an area while destroying the information previously recorded there, i.e., overwriting, accurately.

Even with the three-layer structure of the first to third magnetic thin films 11 to 13, it is at least required in order to achieve light-intensity-modulated overwriting by subjecting the medium to temperatures $T_1$ and $T_2$ that the following expressions (8) and (9) are satisfied. More particularly, in order that transfer of a magnetized state of the second magnetic thin film 12 to the first magnetic thin film 11, that is, transition from the state C to the state A, or from the state D to the stage E, takes place at a temperature just below the Curie temperature $T_{C1}$ of the first magnetic thin film 11, i.e., a high temperature below and in the vicinity of $T_{C1}$, it is required that the following expression corresponding to the above described expression (5)

$$\sigma_{wa} > 2M_{S1}h_1H_{C1} \tag{8}$$

is satisfied, and, on the other hand, it is required, in order that the recorded domains of the first magnetic thin film 11 are preserved at room temperature, or at the time of reproduction, that the following expression is satisfied $$\sigma_{wa} < 2M_{S1}h_1H_{C1} \tag{9}$$

where $\sigma_{wa}$ is the domain wall energy existing between the first and second magnetic thin films 11 and 12, namely, virtually at the position where the third magnetic thin film 13 is present and corresponds to the above described $\sigma_w$. In these conditional expressions (8) and (9), the external magnetic field is neglected because it is as low, for example, as 200 to 300 Oe as against the coercive force $H_{C1}$ which is 1 kOe to 2 kOe.

Figure 18:
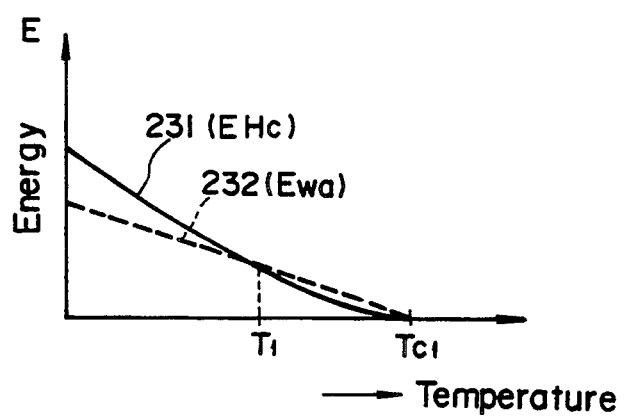
FIGS. 18, 23, and 25 are temperature characteristics of magnetic domain wall energy and coercive force energy.

Thus, it is required that the relative magnitude of $\sigma_{wa}$ to $2M_{S1}h_1H_{C1}$ at room temperature is reversed at the high temperature just below the Curie temperature $T_{C1}$ of the first magnetic thin film 11. That is, as shown in FIG. 18, in which the relationship between temperature characteristics of $E_{HC1} = 2M_{S1}h_1H_{C1}$ and $E_{wa} = \sigma_{wa}$ are plotted by a solid line curve 231 and a broken line curve 232, respectively, the relative magnitude between these energy items is required to be reversed at a specified temperature $T_1$. In this case, the temperature $T_1$ at which $\sigma_{wa}$ and $2M_{S1}h_1H_{C1}$ become equal is virtually the temperature at which the magnetization in the first magnetic thin film 11 is oriented in the same direction as the magnetization in the second magnetic thin film 12, namely, the erasing temperature.

In practical use, however, mere satisfaction of the expressions (8) and (9) is not a sufficient condition. It is further desired that the quantity $\sigma_{wa} - 2M_{S1}h_1H_{C1}$ is as great as possible at the temperature right below the Curie temperature $T_{C1}$ of the first magnetic thin film 11, and the greater the quantity $2M_{S1}h_1H_{C1} - \sigma_{wa}$ is, the more steadily the recorded bits or magnetic domains can be preserved. While it is required that the temperature $T_1$ is controlled to be steady at the time of mass production, since, practically, a large difference between $E_{wa}$ and $E_{HC1}$ cannot be obtained from the above described three-layer structure, the temperature $T_1$ suffers a great change when $E_{wa}$ or $E_{HC1}$ varies.

Figure 19:
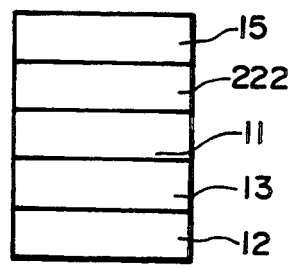
FIG. 19 is a schematic diagram of a thermomagnetic recording medium of a reference example.
Figure 20:
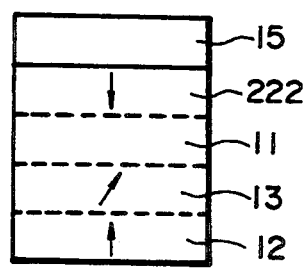
FIG. 20 is an explanatory drawing of a magnetized state in the above.

Imagining now that a reproducing layer having a large Kerr rotation angle $\theta_K$ for enhancing reproduction output as described above is to be provided for a thermomagnetic recording medium of the above described three-layer structure, the reproducing layer, i.e., the reproducing layer 222 formed of a vertically magnetizable film having a high Curie temperature $T_{C1}$, hence a large Kerr rotation angle $\theta_k$, will be deposited on a substrate 15, as schematically shown in FIG. 19, and further, the first magnetic thin film 11, the third magnetic thin film 13, and the second magnetic thin film 12 as described in FIG. 3 will be deposited thereon one after another, and thereby the medium will be constructed. With such an arrangement, when the previously recorded state is such, as shown in FIG. 20 indicating the directions of the spin in the transition metal, for example iron Fe, by arrows in the respective magnetic films, that the directions of the spin in the reproducing layer 222 and the second magnetic thin film 12 are reverse, and then, if the medium is subjected to the temperature $T_1$ for performing overwriting, it sometimes occurs that the direction of magnetization in the first magnetic thin film 11 becomes unstable by the effects of the spin from both the reproducing layer 222 and the second magnetic thin film 12, and thereby, the phenomenon of the magnetization in the first magnetic thin film 11 to comply with that of the second magnetic thin film 12, i.e., transfer of the latter to the former, becomes difficult to occur, and thus, the state A as described, for example, in FIG. 3 becomes difficult to be smoothly attained. In order that the transfer is smoothly performed, the following condition is required to hold $$\sigma_{wa} > 2M_{S1}h_1H_{C1} + 2M_{SR}h_RH_{CR} \qquad (10)$$

where $M_{SR}$, $h_R$, and $H_{CR}$ are saturation magnetization, film thickness, and coercive force of the reproducing layer 222. And in this case, it is assumed that the interface domain wall energy between the reproducing layer 222 and the first magnetic thin film 11 is sufficiently larger than $2M_{SR}h_RH_{CR}$. By providing the reproducing layer 222 as described above, the right-hand side of expression (10) becomes larger, and therefore, as a means to make it easier to satisfy expression (10), the film thickness $h_R$ of the reproducing layer 222 should be made thin. Then, there arises a problem that the reproducing layer 222 becomes less effective in performing its function as the reproducing layer. In order not to sacrifice the thickness of the reproducing layer, it becomes necessary to increase $\sigma_{wa}$. Then, it contradicts with the provision of the third magnetic thin film 13 having in-plane magnetic anisotropy or small perpendicular magnetic anisotropy at room temperature.

Therefore, it becomes necessary, while making use of the three-layer structure of the first and second magnetic thin films and the third magnetic thin film interposed therebetween as the basic structure, to provide the means to make sure that the above expressions (8) and (9) are satisfied thereby both at the temperature right below the Curie temperature $T_{C1}$ of the first magnetic thin film 11 and at room temperature, and further, to have the above described erasing temperature $T_1$ steadily set up.

It is further required to overcome the problem of the instability occurring when a reproducing layer, i.e., a magneto-optical reproducing medium having a large Kerr rotation angle, is provided for the above described three-layer basic structure.

Figure 21:
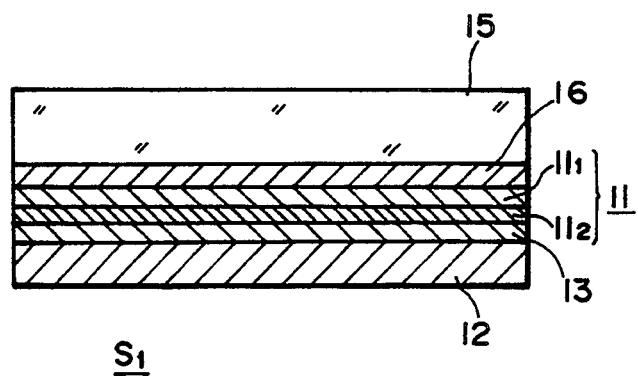

To meet the aforesaid necessity is used a thermomagnetic recording medium $S_1$ which as shown in a schematic sectional view of FIG. 21 includes a laminated film consisting of a first magnetic thin film 11 formed of a first component film $11_1$ and a second component film $11_2$, each thereof having perpendicular magnetic anisotropy, a second magnetic thin film 12 having perpendicular magnetic anisotropy, and a third magnetic thin film 13 having in-plane magnetic anisotropy or small perpendicular magnetic anisotropy interposed between the first component film $11_1$ of the first magnetic thin film 11 and the second magnetic thin film 12, formed into a laminated structure being magnetically coupled to the adjoining films in turn. The Curie temperature $T_{C12}$ of the second component film $11_2$ is set to be higher than the Curie temperature $T_{C11}$ of the first component film $11_1$ of the first magnetic thin film 11. A first heating condition for heating the medium to a temperature $T_1$ which is in the vicinity of the Curie temperature $T_{C11}$, not causing reversal of the magnetic moment in the second magnetic thin film 12, and sufficient to change the magnetic moment in the second component film $11_2$ of the first magnetic thin film 11 in compliance with the magnetic moment in the second magnetic thin film 12 and a second heating condition for heating the same to a temperature $T_2$ which is above the Curie temperature $T_{C12}$ and sufficient to cause reversal of the magnetic moment in the second magnetic thin film 12 are modulated in accordance with an information signal to be recorded, whereby, while the medium is cooled from the heated states, record magnetization is formed also in the first component film $11_1$ in compliance with the magnetization in the second component film $11_2$ of the first magnetic thin film 11.

Figure 22:
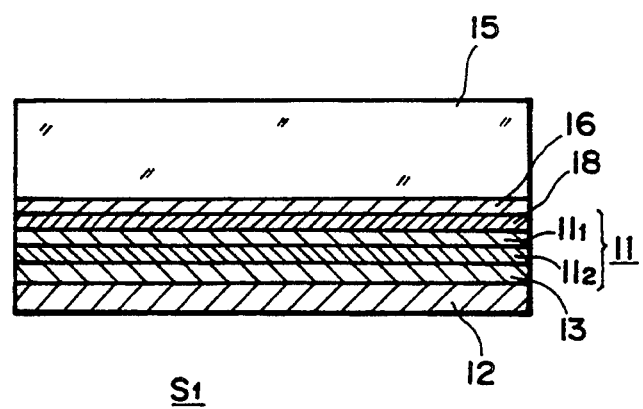

Further, to meet the aforesaid requirement is used a thermomagnetic recording medium $S_2$ which as shown in a schematic sectional view of FIG. 22 includes a laminated film consisting of a first magnetic thin film 11 formed of a first component film $11_1$ and a second component film $11_2$, each thereof having perpendicular magnetic anisotropy, a second magnetic thin film 12 having perpendicular magnetic anisotropy, and a third magnetic thin film 13 having in-plane magnetic anisotropy or small perpendicular magnetic anisotropy interposed between the first component film $11_1$ of the first magnetic thin film 11 and the second magnetic thin film 12, formed into a laminated structure being magnetically coupled to the adjoining films in turn, further having a magneto-optical reproducing thin film 18 disposed in the front of the first component film $11_1$ of the first magnetic thin film 11 magnetically coupled thereto. The Curie temperature $T_{C12}$ of the second component film $11_2$ is set to be higher than the Curie temperature $T_{C11}$ of the first component film $11_1$ of the first magnetic thin film 11, and further, the magneto-optical optical reproducing film 18 is adapted to satisfy $$2M_{SR}h_RH_{CR} + 2M_{S11}h_{11}H_{C11} < \sigma_{wa} + 2M_{S12}h_{12}H_{C12} \qquad (11)$$

(where $M_{SR}$, $M_{S11}$ and $M_{S12}$; $h_R$, $h_{11}$, and $h_{12}$; $H_{CR}$, $H_{C11}$, and $H_{C12}$ are saturation magnetization, film thickness, and coercive force of the magneto-optical reproducing thin film 18, first, and second component films $11_1$ and $11_2$, respectively, and $\sigma_{wa}$ is domain wall energy between the second component film $11_2$ and the second magnetic thin film 12) and having a larger Kerr rotation angle $\theta_K$ than the first component film $11_1$. A first heating condition for heating the medium to a temperature $T_1$ which is in the vicinity of the Curie temperature $T_{C11}$, not causing reversal of the magnetic moment in the second magnetic thin film 12, and sufficient to change the magnetic moment in the second component film $11_2$ of the first magnetic thin film 11 in compliance with the magnetic moment in the second magnetic thin film 12 and a second heating condition for heating the same to a temperature $T_2$ which is above the Curie temperature $T_{C12}$ and sufficient to cause reversal of the magnetic moment in the second magnetic thin film 12 are modulated in accordance with an information signal to be recorded, whereby, while the medium is cooled from the heated states, record magnetization is formed also in the first component film $11_1$ and magneto-optical reproducing thin film 18 in compliance with the magnetization in the second component film $11_2$ of the first magnetic thin film 11.

In both the above described structures, the Curie temperatures $T_{C11}$ and $T_{C12}$ of the first and second component films $11_1$ and $11_2$ of the first magnetic thin film 11 and the Curie temperatures $T_{C2}$ and $T_{C3}$ of the second and third magnetic thin films 12 and 13 are selected to be $T_{C11} < T_{C12} < T_{C3}$, $T_{C2}$.

The above described first example of FIG. 21 is characterized in that the first magnetic thin film 11 is formed of the first and second component films $11_1$ and $11_2$, and the Curie temperatures $T_{C11}$ and $T_{C12}$ of the component films $11_1$ and $11_2$ are selected to be such that the Curie temperature $T_{C12}$ of the second component film $11_2$ is higher than the other, i.e., $T_{C11} < T_{C12}$. According to this example, the effective coercive force energy of the first magnetic thin film 12 of a two-layer structure is given, as shown, for example, in FIG. 23, by the sum total of the energy of the first and second component films $11_1$ and $11_2$ having different Curie temperatures, i.e., sum total of $E_{HC11}$ ($= 2M_{S11}h_{11}H_{C11}$) represented by the curve $204_{11}$ and $E_{HC12}$ ($= 2M_{S12}h_{12}H_{C12}$) represented by the curve $204_{12}$, that is, it is represented by the curve 241 which has an inflection point in the vicinity of the Curie temperature $T_{C11}$ and shows a steeper temperature characteristic on the side lower than $T_{C11}$ toward room temperature. Meanwhile, $E_{wa}$ has a linear temperature characteristic as shown by the curve 242, and hence, the difference therebetween becomes large at the temperature lower than the temperature $T_1$, whereby the recorded information bits, i.e., magnetic domains, can be steadily retained, and further, the temperature $T_1$ where both the characteristic curves 242 and 241 intersect can be prevented from greatly varying even when some variations are made in $E_{wa}$, $E_{HC11}$, and $E_{HC12}$ in the manufacturing process of the thermomagnetic recording media. Further, at the high temperature in the vicinity of $T_1$, the characteristic of the first magnetic thin film 11 depends only on the characteristic of the second component film $11_2$, so that the effective thickness of the first magnetic thin film 11 is reduced to the small thickness $h_{12}$ only of the second component film $11_2$, and therefore, expression (8) can also be satisfied.

Further, according to the example described in FIG. 22, the structure used therein is provided with a magneto-optical reproducing thin film 18 having a large Kerr rotation angle $\theta_K$ added to the above described structure and adapted to satisfy the above described expression (11). Hence, in overwriting, the first magnetic thin film 11 is prevented from becoming unstable affected by the direction of the magnetization in the magneto-optical reproducing thin film 18 having a high Curie temperature $T_{C1}$ and the first component film $11_1$ is ensured to form recorded magnetization therein in compliance with the second component film $11_2$ in the vicinity of the Curie temperature $T_{C11}$ of the first component film $11_1$.

A thermomagnetic recording medium $S_1$ used here is provided, as shown in FIG. 21, by depositing, in turn, first and second component films $11_1$ and $11_2$ constituting a first magnetic thin film 11, a third magnetic thin film 13, and a second magnetic thin film 12, through a dielectric film 16 serving as a protecting film or interference film, over one side of a light transmitting substrate 15 made of a glass plate, acrylic plate, or the like.

The first and second component films $11_1$ and $11_2$ of the first magnetic thin film 11 are rare earth-transition metal thin films made of a material having rather great perpendicular magnetic anisotropy $K_U$, such as TbFeCo. Both the component films $11_1$ and $11_2$ may be made of either a rare earth rich film or a transition metal rich film but the following conditions must be satisfied. That is, the condition $$\sigma_{wa} > 2M_{S12}h_{12}H_{C12} + 2M_{S12}h_{12}H_{ex} \qquad (12)$$

must be satisfied at the temperature right below the Curie temperature $T_{C12}$ of the second component film $11_2$, and the condition $$\sigma_{wb} > 2M_{S11}h_{11}H_{C11} + 2M_{S11}h_{11}H_{ex} \qquad (13)$$

must be satisfied at the temperature right below $T_{C11}$ (where $\sigma_{wb}$ is the domain wall energy density on the interface between the first component film $11_1$ and the second component film $11_2$, and $H_{ex}$ is the external magnetic field, i.e., the external recording magnetic field).

A thermomagnetic recording medium $S_2$ is provided with the above described structure of the thermomagnetic recording medium $S_1$ and additionally a magneto-optical reproducing thin film 18 as shown in FIG. 22. More particularly, also in the thermomagnetic recording medium $S_2$, a light transmitting substrate 15 made of a glass plate, acrylic plate, or the like is used as shown in FIG. 22, and a magneto-optical reproducing thin film 18, first and second component films $11_1$ and $11_2$ constituting a first magnetic thin film 11, a third magnetic thin film 13, and a second magnetic thin film 12, are deposited, in turn, through a dielectric film 16 serving as a protecting film or interference film, over one side of the substrate.

The depositing of the films 16, $11_1$, $11_2$, 13, and 12, or the films 16, 18, $11_1$, $11_2$, 13, and 12 of the thermomagnetic recording media $S_1$ and $S_2$ are each achieved by making laminating sputtering in a successive or simultaneous manner through the use, for example, of a magnetron type sputtering apparatus performing, for example, multiple-source sputtering, namely, sputtering from multiple-source targets.

The third magnetic thin film 13 of each of the thermomagnetic recording media $S_1$ and $S_2$ is desired to have in-plane magnetic anisotropy or lower perpendicular magnetic anisotropy than that of the first and second magnetic thin films 11 and 12, as low as, for example, $1 \times 10^6$ erg/cm$^3$ at room temperature and, in addition, be made of a rare earth rich metallic film having the temperature characteristic of its effective magnetic anisotropy constant K being convex upward or linear and the saturation magnetization $M_S$ at room temperature being 0 to 450 emu/cm$^3$.

In the media $S_1$ and $S_2$, the second magnetic thin film 12 can be formed of GdTbFeCo having great perpendicular magnetic anisotropy.

The thermomagnetic recording medium $S_1$ will first be described mentioning an embodiment of it.

Embodiment 6

A thermomagnetic recording medium $S_1$ of the structure as shown in FIG. 21 including the magnetic thin films $11_1$, $11_2$, 13, and 12 having the compositions, magnetic characteristics, and film thicknesses as shown in Table 6 below was prepared.

TABLE 6

| Thin Film | Composition | Magentization (emu/cc) | Coercive Force (kOe) | Curie Temp. (°C.) | Film Thickness (Å) |
|---|---|---|---|---|---|
| ($11_1$) | TbFeCo | 30 | 15 | 170 | 250 |

TABLE 6-continued

| Thin Film | Composition | Magentization (emu/cc) | Coercive Force (kOe) | Curie Temp. (°C.) | Film Thickness (Å) |
|---|---|---|---|---|---|
| (11₂) | TbFeCo | 20 | 23 | 210 | 250 |
| (13) | GdFeCo | 400 | — | 235 | 150 |
| (12) | GdTbFeCo | 180 | 3.2 | 350 | 580 |

Figure 23:
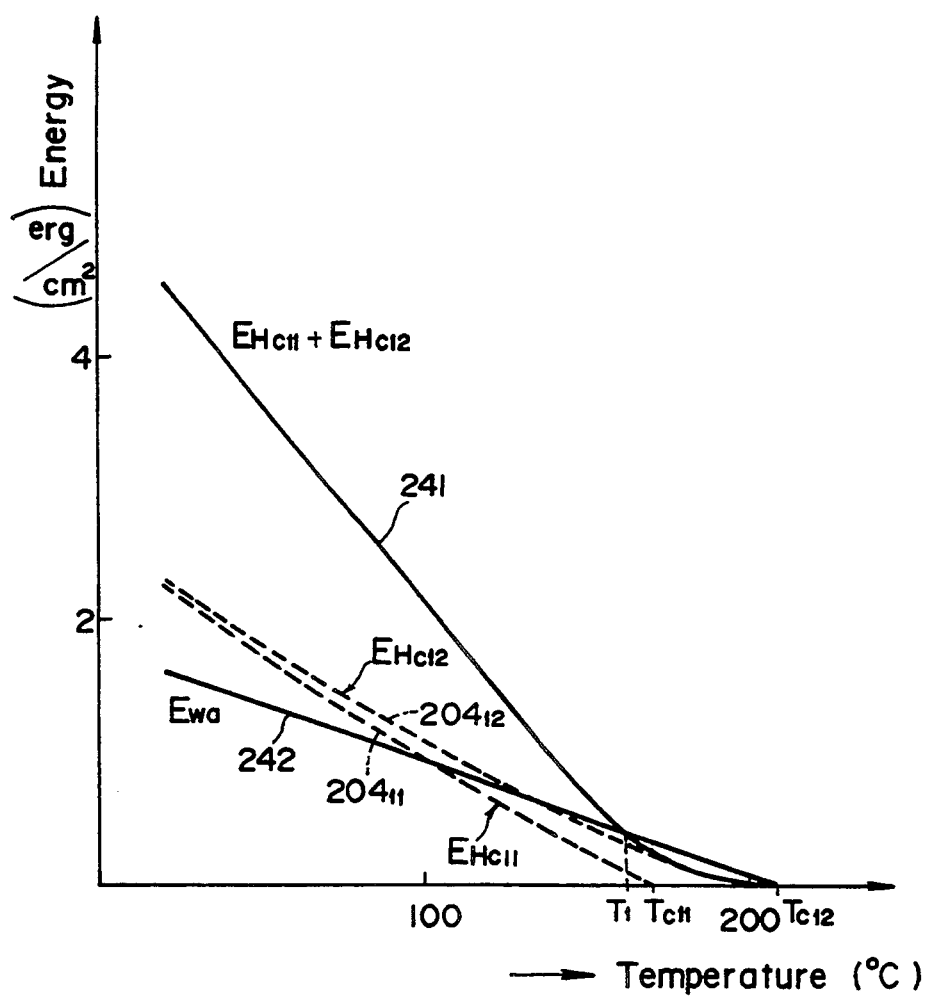
Figure 24:
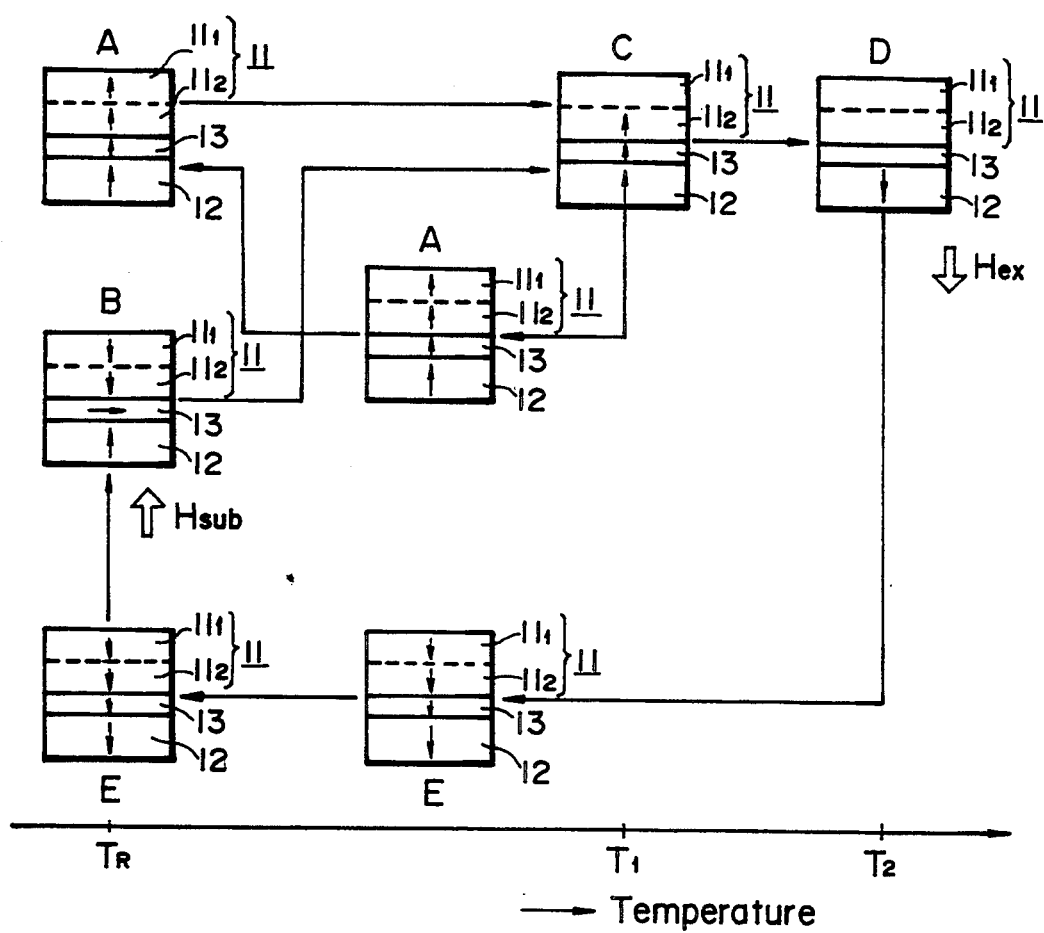

The manner of operations when thermomagnetic recording is made with the above described thermomagnetic recording medium $S_1$ will be described with reference to the drawing of FIG. 24 showing magnetized states. In FIG. 24, the directions of the spin of the transition metal Fe in the films $11_1$, $11_2$, 13, and 12 are indicated by arrows. In this case, the directions of the external magnetic field $H_{ex}$ and the subsidiary external magnetic field $H_{sub}$ differ with the composition of the second magnetic thin film 12, but the illustrated case is where a transition metal rich film is used for it. The first temperature $T_1$ is selected, for example, to be right below the Curie temperature $T_{C11}$ of the first component film $11_1$, and the second temperature $T_2$ is selected to be above the Curie temperature $T_{C12}$ of the second component film $11_2$. Also in this case, in the same manner as described with reference to FIG. 1 and FIG. 3, information is recorded by the states A and B, that is, by the state A wherein the first and the second magnetic thin films 11 and 12 are magnetized oriented in the same direction and the state B wherein the same are magnetized oriented in the reverse directions. In this case, once the medium has been heated at the first temperature $T_1$ (the erasing temperature $T_1$ in FIG. 23) by irradiation, for example, of a laser beam, the direction of the spin in the second component film $11_2$ in the process of the medium cooled from that temperature is brought to the state C wherein it is in agreement with that of the second magnetic thin film 12, no matter whether the previous state was A or B, according to the above described expression (13) and the intersection of the curves 241 and 242 in FIG. 23, and in the process cooled down to right below the Curie temperature $T_{C11}$ of the first component film $11_1$, the direction of the spin in the first component film $11_1$ is brought into agreement with that of the second component film $11_2$ by the arrangement made so that expression (13) is satisfied. Thus, no matter whether the state is A or B, overwriting of the state A is achieved by bringing the medium to the first temperature $T_1$. By heating the medium to the second temperature $T_2$ above the Curie temperature $T_{C2}$ of the second magnetic thin film 12, namely, above the first and second Curie temperatures $T_{C11}$ and $T_{C12}$, similarly by irradiation, for example, of a laser beam, the direction of the spin in the second magnetic thin film 12 is reversed by virtue of the external magnetic field (recording field) $H_{ex}$, and in the subsequent cooling stage, the state E is brought about wherein the directions of the spin in the first and second component films $11_1$ and $11_2$ of the first magnetic thin film 11 are in agreement with the direction of the spin in the second magnetic thin film 12 according to the conditional expressions (12) and (13). And in the state cooled down to room temperature, the state E is changed by virtue of the subsidiary external magnetic field $H_{sub}$ to the state B wherein the direction of the spin in the second magnetic thin film 12 is reversed. In order that this transition takes place, the subsidiary external magnetic field $H_{sub}$ is selected to satisfy the following condition.

$$H_{sub} > H_{C2} + \sigma_{wa}/2M_{S2}h_2. \tag{14}$$

In the present embodiment, referring to FIG. 23 showing temperature characteristics of the coercive force energy in the first magnetic thin film 11 and the domain wall energy between the first and the second magnetic thin films, the domain wall energy is kept sufficiently small in the vicinity of room temperature as indicated by the curve 242, and therefore, the subsidiary external magnetic field $H_{sub}$ in expression (14) can be made sufficiently small.

Further, in order to stabilize the magnetized state of the first and second component films $11_1$ and $11_2$ of the first magnetic thin film 11 in the state B, the following condition must be satisfied.

$$\frac{M_{S11}h_{11}H_{C11} + M_{S12}h_{12}H_{C12}}{M_{S11}h_{11} + M_{S12}h_{12}} > H_{sub} + \frac{\sigma_{wa}}{2(M_{S11}h_{11} + M_{S12}h_{12})} \tag{15}$$

Reference Example 2

A thermomagnetic recording medium of a three-layer structure of the structure shown in FIG. 21 but the first magnetic thin film therein is formed of a single film was used. Compositions, magnetic characteristics, and film thicknesses of the constituent films in this case are shown in Table 7 below.

TABLE 7

| Thin Film | Composition | Magentization (emu/cc) | Coercive Force (kOe) | Curie Temp. (°C.) | Film Thickness (Å) |
|---|---|---|---|---|---|
| (11) | TbFeCo | 30 | 15 | 170 | 500 |
| (13) | GdFeCo | 400 | — | 235 | 125 |
| (12) | GdTbFeCo | 180 | 3.2 | 350 | 580 |

Figure 25:
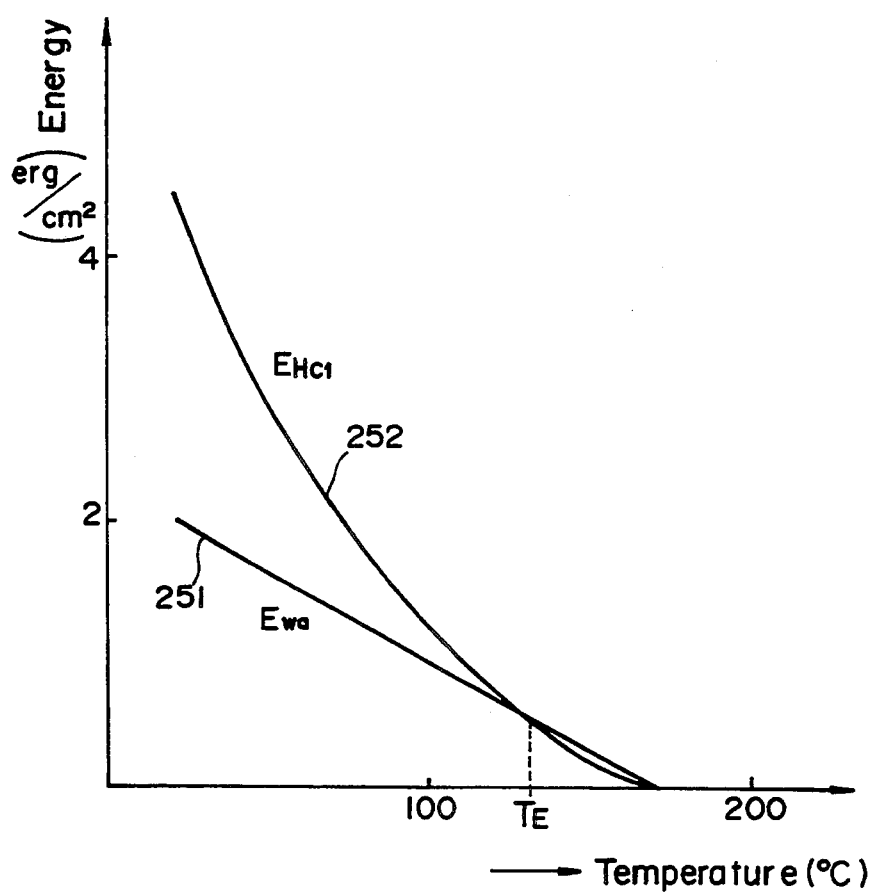

Temperature characteristics of the domain wall energy $E_{wa}$ ($=\sigma_{wa}$) between the first and second magnetic thin films 11 and 12 and the coercive force energy of the first magnetic thin film 11 in this case are shown by the curves 251 and 252, respectively, in FIG. 25.

Variations of the erasing temperature $T_1$ for the embodiment 6 and the reference example 2 will be considered referring to FIG. 23 and FIG. 25. Variations of the domain wall energy $E_{wa}$ with change in the film thickness $h_3$ of the third magnetic thin film 13 or the like are such, at the temperature 20° C., that $E_{wa} \approx 2$ erg/cm² when the film thickness $h_3 = 125$ Å and that $E_{wa} \approx 1.6$ erg/cm² when the film thickness $h_3 = 150$ Å. It is found in the case of FIG. 25 for the reference example 2 that $\sigma_{wa} = 2$ erg/cm² and the temperature at which $E_{HC-1} = E_{wa}$ is obtained is around 130° C., while in the case of FIG. 23 for the embodiment 6, $\sigma_{wa} = 1.6$ erg/cm² and the temperature $T_1 \approx 165°$ C. Since 0.2 erg/cm² or so of error for $\sigma_{wa}$ generally occurs in the manufacture, it is now assumed that it has become $\sigma_{wa} = 1.8$ erg/cm² (at 20° C.). Then, from FIG. 25, $T_1$ becomes $T_1 \approx 148°$ C. for the three-layer film of the reference example 2, while it becomes $T_1 \approx 162°$ C. for the embodiment 6 of FIG. 23. Hence, while 18° C. of variation in the temperature $T_1$ is produced in the three-layer film against a change of 0.2 erg/cm² in $\sigma_{wa}$, that for the four-layer film of the embodiment 6 of the present invention is kept to a variation as small as 3° C.

Thus, by forming the first magnetic thin film of two layers having different Curie points, it becomes possible, at the time of mass production, to reduce the variations in the temperature $T_1$ against changes in $E_{wa}$ or $E_{HC}$.

With the above described structure, it is preferred that $T_{C11} - T_{C12}$ is 10°–70° C. This is because, if it is less than 10° C., the effect as described in FIG. 23 is not obtained so much, and, if it exceeds 70° C., i.e., if $T_{C12}$ becomes too high, it becomes necessary to raise the second temperature $T_2$ and hence to have large recording power.

Embodiment 7

Thermomagnetic recording media $S_2$ of the structure as shown in FIG. 22 including the magnetic thin films 18, $11_1$, $11_2$, 13, and 12 having the compositions, magnetic characteristics, and film thicknesses as shown in Table 8 below were prepared.

TABLE 8

| Thin Film | Composition | Magentization (emu/cc) | Coercive Force (kOe) | Curie Temp. (°C.) | Film Thickness (Å) |
|---|---|---|---|---|---|
| (18) | GdFeCo | 30 | 0.4 | 400 | $h_R$ |
| ($11_1$) | TbFeCo | 30 | 15 | 170 | 250 |
| ($11_2$) | TbFeCo | 20 | 23 | 210 | 250 |
| (13) | GdFeCo | 400 | — | 235 | 150 |
| (12) | GdTbFeCo | 180 | 3.2 | 350 | 580 |

Figure 26:
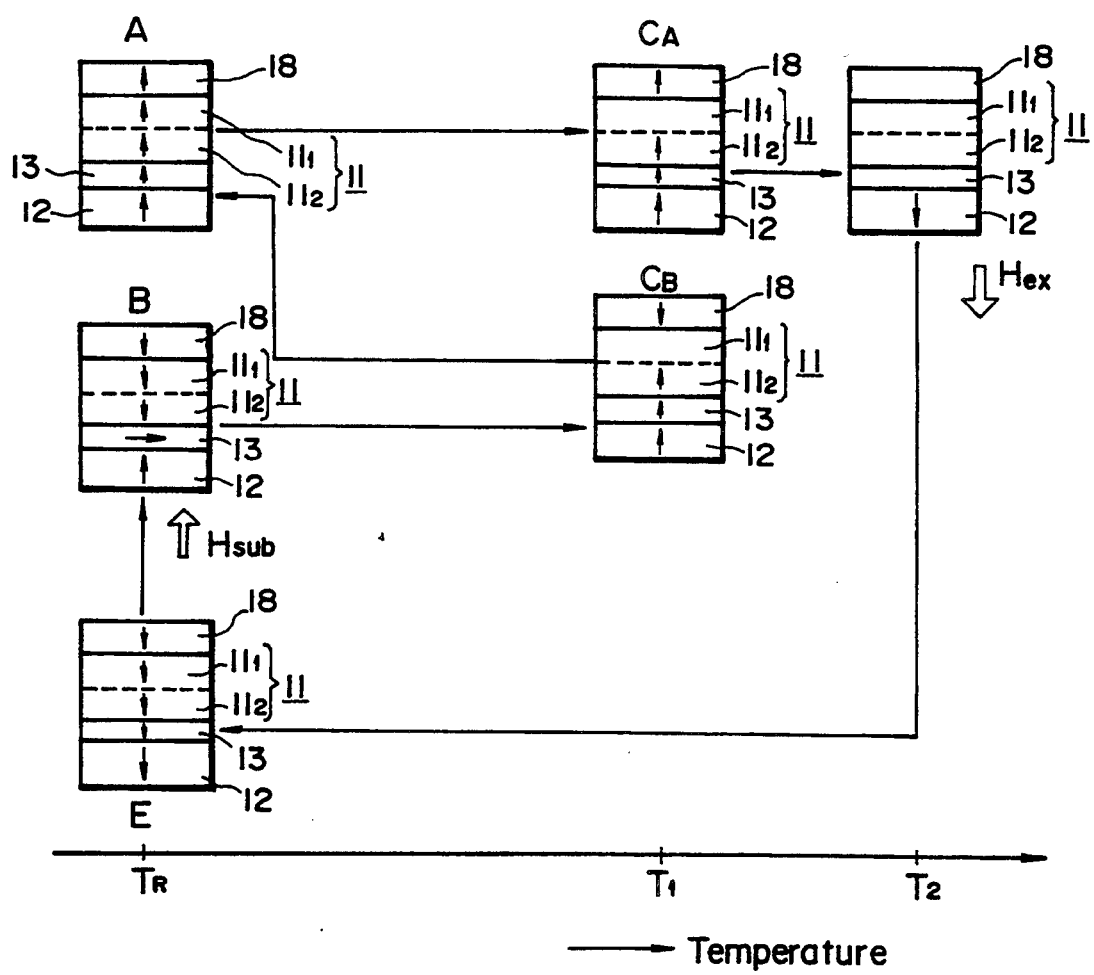

A thermomagnetic recording medium $S_{2A}$ was prepared by setting the thickness $h_R$ of the magneto-optical reproducing thin film 18 to 75 Å, and a thermomagnetic recording medium $S_{2B}$ was prepared by setting the thickness $h_R$ of the magneto-optical reproducing thin film 18 to 150 Å. These media $S_{2A}$ and $S_{2B}$ were structured so as to satisfy the above described expression (11). The manner of operations for thermomagnetic recording using these thermomagnetic recording media $S_{2A}$ and $S_{2B}$ is shown in FIG. 26. Referring to FIG. 26, the directions of the spin in the transition metal Fe are shown by arrows drawn in each of the films 18, $11_1$, $11_2$, 13, and 12. Also in this case, the first temperature $T_1$ was selected to be the Curie temperature $T_{C11}$ of the first component film $11_1$ and the second temperature $T_2$ was selected to be above the Curie temperature $T_{C12}$ of the second component film $11_2$. Also in this case, the same as described in FIG. 1 or FIG. 3, recording of information is made by the states A and B, namely, by the state A wherein the first and the second magnetic thin films 11 and 12 are magnetized in the same direction and the state B wherein they are magnetized in the reverse directions. In either of the states, the reproducing thin film 18 is magnetized in the same direction as the first magnetic thin film 11. In this case, if the medium is irradiated, for example, by a laser beam and heated up, for example, to the temperature $T_1$ right below the Curie temperature $T_{C11}$ of the first component film $11_1$, the direction of the second component film $11_2$ is brought into agreement with that of the second magnetic thin film 12 according to the characteristics shown in FIG. 23. Since, at this time, the Curie temperature $T_{CR}$ of the magneto-optical reproducing thin film 18 is high, either a state $C_A$ or a state $C_B$ is brought about depending on whether the previous state was the state A or the state B. However, as the medium is cooled toward room temperature $T_R$, even if there has been produced the state $C_B$, it is ensured to be changed to the state A during the cooling stage because conditions satisfying expression (11) have been provided, or more particularly, the sum total of the coercive force energy of the magneto-optical reproducing thin film 18 and the coercive force energy of the first component film $11_1$ has been selected to be smaller than the sum total of the domain wall energy $\sigma_{wa}$ between the second component film $11_2$ and the second magnetic thin film 12 and the coercive force energy of the second component film $11_2$. Thus, by subjecting the medium to the first temperature $T_1$, recording of information in the state A is achieved. Similarly, by heating the medium with irradiation, for example, of a laser beam up to the second temperature $T_2$ above the Curie temperature $T_{C2}$ of the second magnetic thin film 12, i.e., above the first and second Curie temperatures $T_{C11}$ and $T_{C12}$, the direction of the spin in the second magnetic thin film 12 is reversed under the influence of the external magnetic field (recording field) $H_{ex}$, and in the cooling stage of the medium, the state E is brought about wherein the directions of both the first and the second component films $11_1$ and $11_2$ of the first magnetic thin film 11 are in agreement with the direction of the second magnetic thin film 12 according to the above described expressions (12) and (13). When the medium is cooled down to room temperature, the state E is changed by the influence of the subsidiary external magnetic field $H_{sub}$ to the state B wherein the spin of the second magnetic thin film 12 is reversed. To effect this, the subsidiary external magnetic field $H_{sub}$ has been selected to satisfy the above described expression (14), and further, the subsidiary external magnetic field $H_{sub}$ can be made sufficiently small the same as described in the embodiment 6.

Reference Example 3

A thermomagnetic recording medium with a reproducing layer 222 additionally laminated to the three-layer structure described in FIG. 19 was used and thermomagnetic recording media having thin films 222, 11, 13, and 12 of the compositions, magnetic characteristics, and film thicknesses as shown in Table 9 below were prepared.

TABLE 9

| Thin Film | Composition | Magentization (emu/cc) | Coercive Force (kOe) | Curie Temp. (°C.) | Film Thickness (Å) |
|---|---|---|---|---|---|
| (222) | GdFeCo | 30 | 0.4 | 400 | $h_R$ |
| (11) | TbFeCo | 30 | 15 | 170 | 500 |
| (13) | GdFeCo | 400 | — | 235 | 125 |
| (12) | GdTbFeCo | 180 | 3.2 | 350 | 580 |

Here, media $S_{CA}$ and $S_{CB}$ in which the reproducing layers 222 were of different film thicknesses, i.e., $h_R = 75$ Å and $h_R = 150$ Å, respectively, were prepared.

Figure 27:
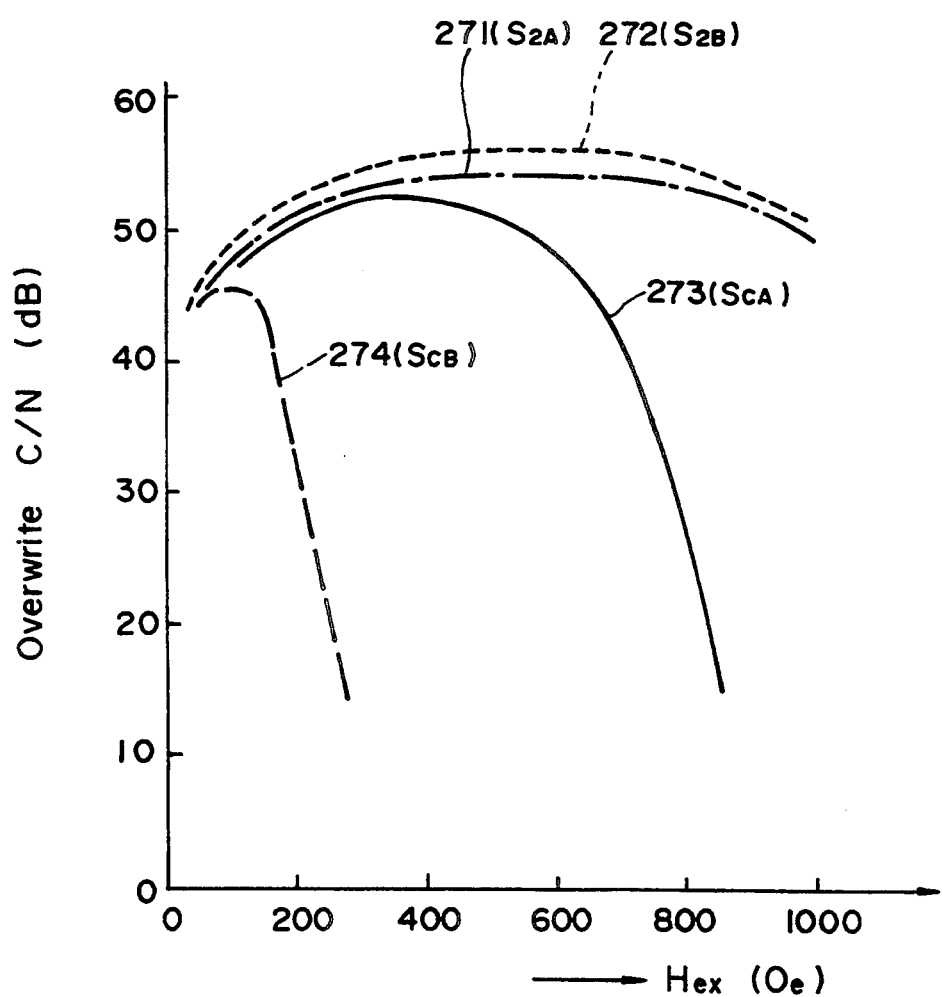
FIG. 27 is a dependence on external magnetic field $H_{ex}$ of C/N at the time of overwriting.

Measurement results of C/N obtained at the times of overwriting made on the media $S_{2A}$ and $S_{2B}$ as well as $S_{CA}$ and $S_{CB}$ of the embodiment 7 and reference example 3 with the external magnetic field $H_{ex}$, strength of which was varied, applied actually are shown in FIG. 27. Referring to the figure, the curves 271, 272, 273, and 274 represent measurement results for the media $S_{2A}$, $S_{2B}$, $S_{CA}$, and $S_{CB}$. As apparent from comparison of these, a significant improvement in C/N is achieved in the embodiment 7 of the present invention shown by the curves 271 and 272 as against the reference example 3 shown by the curves 273 and 274. The recording conditions at this time were such that the relative linear speed of the laser beam to the medium was 11.3 m/s, the recording frequency was 5 MHz, the numerical aperture of the objective lens N.A.=0.53, and the wavelength of the laser beam was 780 nm.

As described above, an improvement in eliminating noise at the time of overwriting is achieved in this invention.

Thus, the first temperature $T_1$ can be set not to vary so much, i.e., stabilized operation of the device can be achieved, and while C/N (S/N) can be improved, reduction of the subsidiary external magnetic field can also be attained by reduction of the domain wall energy $\sigma_w$ ($\sigma_a$).

Further, by the provision of the magneto-optical reproducing thin film 18 having a large Kerr rotation angle $\theta_K$, enhancement of the reproduced output can be achieved, and further, by the provision of the magneto-optical reproducing thin film 18 having a large Kerr rotation angle $\theta_K$, i.e., a high Curie temperature $T_{C1}$, improvement for stabilized operation and reduced noise can be achieved.

The second magnetic thin film 12 is assigned the role to determine the state of recorded magnetic domains and the role to determine the magnitude of the initializing magnetic field (subsidiary external magnetic field). Therefore, when a material having a rather low coercive force $H_{C2}$ at room temperature is used for the second magnetic thin film 12 in order to lower the initializing magnetic field, the state of the recorded magnetic domains (form, state of magnetization) is disturbed. Hence, a problem is posed that recording noise is increased and it becomes impossible to keep S/N (C/N) sufficiently high.

Figure 28:
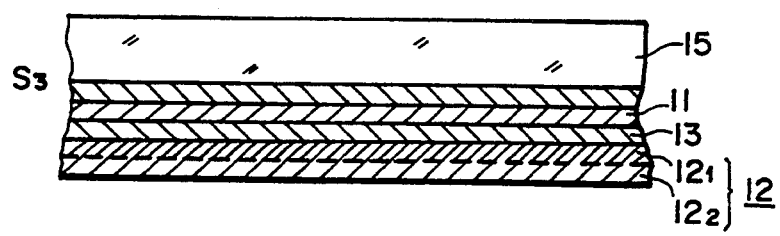

Then, to achieve both decrease in the initializing magnetic field and decrease in the noise, which are conditions conflicting with each other, a thermomagnetic recording medium S, as shown in FIG. 28, is used in the present invention, which is formed of, at least, first and second magnetic thin films 11 and 12, each thereof having perpendicular magnetic anisotropy, laminated to each other, the second magnetic thin film 12 being formed by lamination through exchange coupling of its first and second component films $12_1$ and $12_2$.

Figure 29:
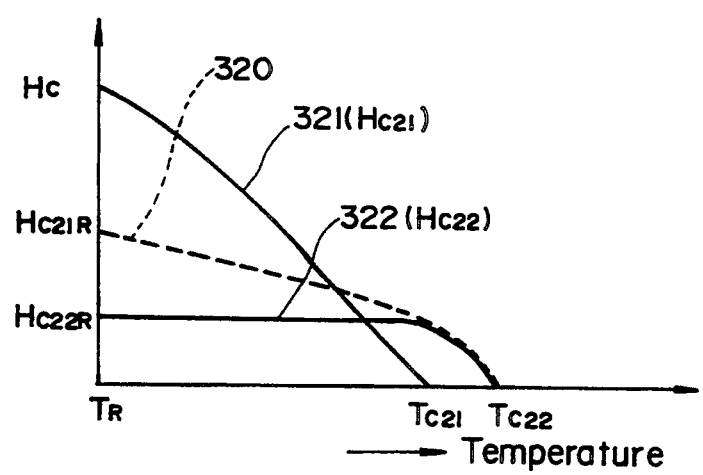
FIG. 29 is temperature characteristics of coercive force in component films of a second magnetic thin film for use in the present invention.

When coercive forces at room temperature of the first and second component films $12_1$ and $12_2$ are represented by $H_{C21R}$ and $H_{C22R}$, respectively, and their Curie temperatures are represented by $T_{C21}$ and $T_{C22}$, their relationships are adapted, as shown in curves 321 and 322 in FIG. 29, to be expressed as $H_{C21R} > H_{C22R}$ and $T_{C21} < T_{C22}$. With the use of such a thermomagnetic recording medium $S_3$, the first heating condition to heat the medium to the first temperature $T_1$ which is virtually in the vicinity of the Curie temperature $T_{C1}$ of the first magnetic thin film and not causing reversal of the magnetic moment of the second magnetic thin film 12 and the second heating condition to heat the medium to the second temperature $T_2$ which is above the Curie temperature $T_{C1}$ and sufficient to cause reversal of the magnetic moment of the second magnetic thin film 12 are modulated according to the information signal to be recorded, and adapts such that both of the magnetic moments in the second magnetic thin film 12 during the course the medium is cooled from the first and second heated states are brought into the same state.

While the same manner of magnetization as that in the process shown in FIG. 3 is performed, decrease of the initializing magnetic field (subsidiary external magnetic field) can be attained without inviting increase in recording noise and lowering of the S/N.

The thermomagnetic recording medium $S_3$ is of similar structure as that described above, but the first and second component films $12_1$ and $12_2$ of the second magnetic thin film 12 are made of a material having small perpendicular magnetic anisotropy and a material having relatively great perpendicular magnetic anisotropy.

Embodiment 8

A thermomagnetic recording medium $S_3$ having magnetic thin films 11, 13, $12_1$, and $12_2$ of compositions, magnetic characteristics, and film thicknesses as shown in Table 10 below and structured as shown in FIG. 28 was prepared.

TABLE 10

| Thin Film | Composition | Magnetization emu/cc | Coercive Force (kOe) | Curie Temp. (°C.) | Magentic Compensation Temp. (°C.) | Film Thickness (Å) |
|---|---|---|---|---|---|---|
| (11) | TbFeCo | 35 | 12 | 170 | — | 510 |
| (13) | GdFeCo | 400 | — | 235 | — | 125 |
| ($12_1$) | GdTbFeCo | 160 | 3.9 | 340 | 230 | 300 |
| ($12_2$) | GdFeCo | 150 | 0.4 | 400 | 200 | 280 |

At this time, the measured reverse magnetic field, i.e., coercive force $H_c$, of the first and second component films $12_1$ and $12_2$ in the exchange coupled two-layer state was 2.4 kOe. The specimen of the above structure will be called the specimen 1.

Embodiment 9

A magnetic recording medium was formed of the same constituents as those of the embodiment 8 only having the relative arrangement of the first and second component films of the second magnetic thin film in FIG. 28 reversed. This will be called the specimen 2.

Reference Example 4

In the arrangement of FIG. 28, the second magnetic thin film 12 was formed into a single-layer structure. A specimen was prepared with compositions, magnetic characteristics, and thicknesses of the films set to be as shown in Table 11 below.

TABLE 11

| Thin Film | Composition | Magnetization emu/cc | Coercive Force (kOe) | Curie Temp. (°C.) | Magentic Compensation Temp. (°C.) | Film Thickness (Å) |
|---|---|---|---|---|---|---|
| (11) | TbFeCo | 35 | 12 | 170 | — | 520 |
| (13) | GdFeCo | 400 | | 235 | | 125 |
| (12) | GdTbFeCo | ~160 | $H_{C2}$ | $T_{C2}$ | ~230 | 580 |

A thermomagnetic recording medium was prepared in the above described arrangement with the coercive force $H_{C2}$ of the second magnetic thin film 12 set to 3.9 kOe and its Curie temperature $T_{C2}$ set to 340° C., as the specimen 3. Another thermomagnetic recording medium was prepared in the same arrangement as above with the coercive force $H_{C2}$ set to 3.1 kOe and its Curie temperature $T_{C2}$ set to 350° C., as the specimen 4. Another thermomagnetic recording medium was prepared in the same arrangement as above with the coercive force $H_{C2}$ set to 2.2 kOe and its Curie temperature $T_{C2}$ set to 360° C., as the specimen 5.

Figure 30:
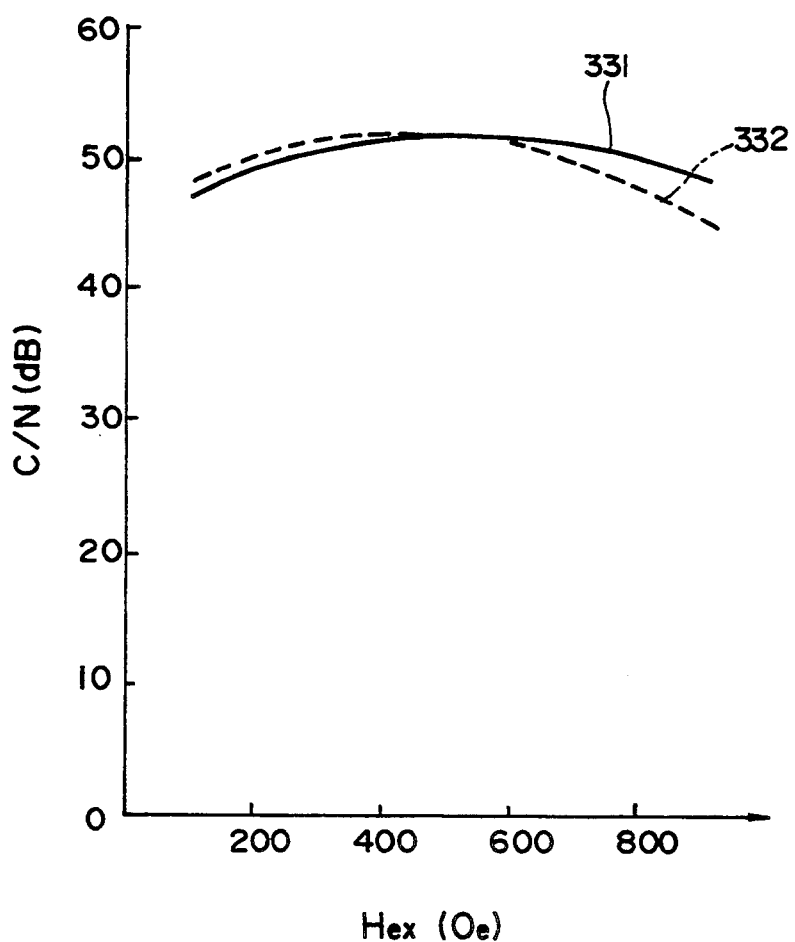
FIGS. 30 and 31 are graphs of dependence on external magnetic field $H_{ex}$ of C/N.
Figure 31:
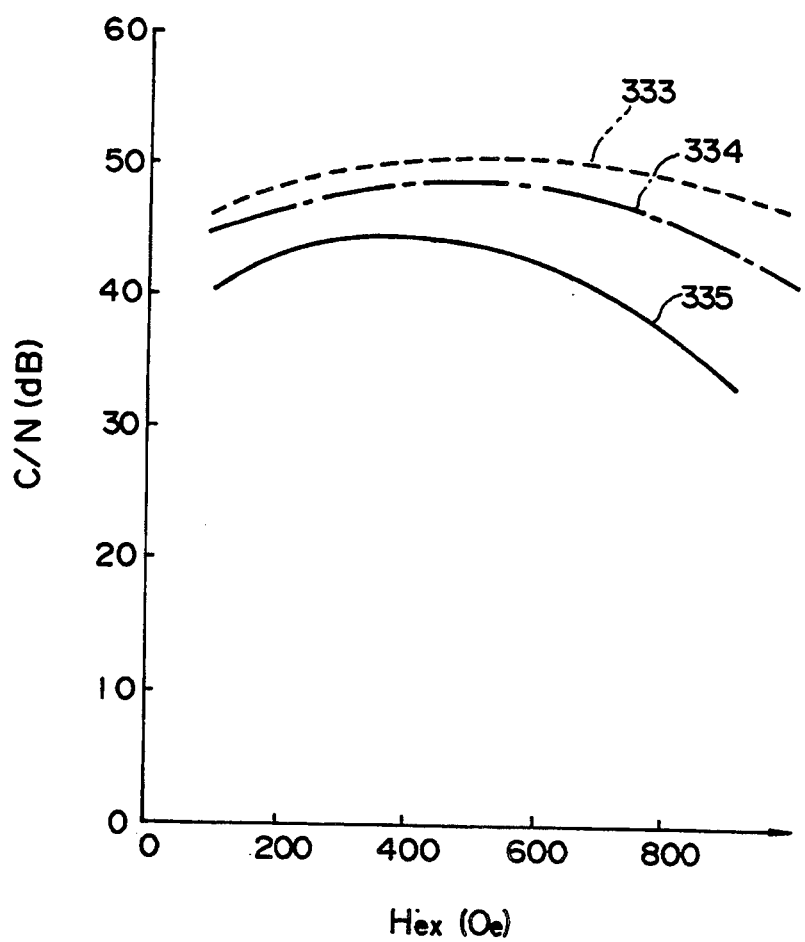

The measurement results of C/N on the specimens 11 and 12 of the embodiments 8 and 9 according to the present invention are shown by curves 331 and 332 in FIG. 30. Further, similar measurement results on the specimens 3 to 5 according to the reference example 3 are shown by curves 333 to 335 in FIG. 31. The measurement of FIG. 30 and FIG. 31 are performed under the conditions of the linear speed of the irradiating laser beam relative to the medium being 10 m/s, the recording frequency being 6.5 MHz, the numerical aperture of the objective lens system N. A.=0.53, and the wavelength of the laser beam being 780 nm. From the comparison of FIG. 30 with FIG. 21, it is apparent that an excellent thermomagnetic recording has been made causing little lowering of C/N against changes in the recording magnetic field $H_{ex}$.

When considering the recording noise, it is known that the noise is produced from unevenness of the shapes of the recorded magnetic domains and unevenness from bit to bit of the state of subdivided structures of the recorded magnetic domains. If ideally recorded magnetic domains are to be shown, they may, for example become uniform circles as in FIG. 32A. Against this, FIG. 5B and FIG. 5C show the noise-producing unevenly shaped magnetic domains and subdivided magnetic domains, respectively. As to how the recorded magnetic domains are produced in the formation of information bits, i.e., recording, it depends on various conditions such as the recording power, the coercive force $H_C$, thickness h, magnetization $M_S$, and domain wall energy $\sigma_B$ of the magnetic thin films, and the external magnetic field $H_{ex}$.

Generally, since the border line where $H_{ex}$ becomes $H_{ex}=H_C$ is unclear with a material having a low Hc value, the shapes of the recorded magnetic domains are frequently disturbed.

Figure 32:
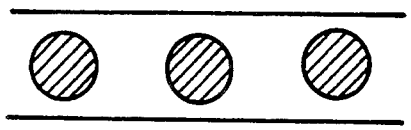
FIG. 32 (A-C) are a schematic diagram showing patterns of recorded domains.
Figure 32:
Figure 32:
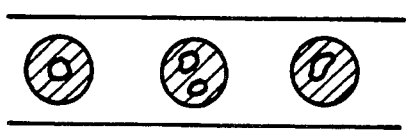

On the other hand, when $H_{ex}$ is insufficient or $\sigma_B$ is not uniformly distributed, the recorded magnetic domains sometimes take the form of the subdivided magnetic domains as schematically shown in FIG. 32C. Since there are present no subdivided magnetic domains in a material having stabilized magnetic domains being large in diameter, $r_{min} \approx \sigma_B/2M_SH_C$ ($r_{min}$=minimum magnetic domain radius), such a phenomenon hardly occurs. For example, since the product $M_SH_C$ is small in GdFeCo, $r_{min}$ becomes large and the recorded domains as shown in FIG. 32C are hardly produced. However, since $H_C$ is small in GdFeCo, the recorded domains as shown in FIG. 32B are liable to appear, producing a great noise resulted therefrom. On the other hand, since TbFeCo has high $H_C$, the noise from the formation of the magnetic domains as shown in FIG. 32C is easily made while the noise from the formation of the magnetic domains as shown in FIG. 32B is hardly made. In conclusion, such a material is preferred as the material for the second magnetic thin film 12 for light-modulated overwriting that has relatively low $H_C$ and exhibiting low recording noise even if $H_{ex}$ is small. Namely, $H_{ex}$ is required to be small to have the earlier described expression (5) satisfied easily.

Figure 33:
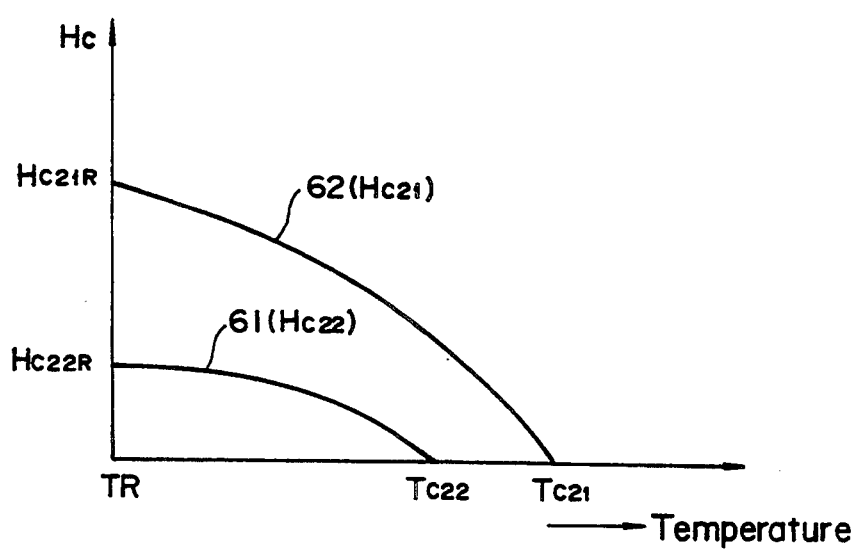
FIG. 33 temperature characteristics of coercive force in component films of a second magnetic thin film used in a reference example.

Further, the second magnetic thin film 12 will be considered. When the same is formed in a single layer, it is required to decrease $H_{C2}$ for lowering $H_{sub}$, from which it necessarily follows that the recorded domains as shown in FIG. 32B are easily formed causing the noise. When forming the second magnetic thin film 12 into a two-layer structure, two arrangements are possible, one being that characterized as shown in FIG. 29 and the other being that characterized by $H_{C21R}>H_{C22R}$ and $T_{C21}>T_{C22}$ as shown by curves 361 and 362 in FIG. 33. In the case where the film is selected to be as characterized in FIG. 33, the magnetic field for reversing magnetization of the second magnetic thin film 12 at room temperature $T_R$ is given by the average of $H_{C21}$ and $H_{C22}$, and therefore, lowering of the subsidiary external magnetic field $H_{sub}$, i.e., the initializing magnetic field of the second magnetic thin film 12 can be achieved. The state at the time of recording is virtually the same as that when recording is performed on a single-layer film 12 of the first component film $12_1$. Hence, the effective $H_C$ at the time of recording on the second magnetic thin film 12 becomes large so that the formation of the magnetic domains as shown in FIG. 32B is suppressed and production of the resultant noise is suppressed. Accordingly, the noise resulting from the formation of the magnetic domains as shown in FIG. 32C comes into question. In contrast, when the arrangement as described in FIG. 29 is employed as in the present invention, since the shapes of the magnetic domains at the time of recording are determined by the first component film $12_1$ having greater $H_C$, formation of the magnetic domains of FIG. 32B is suppressed and thereby production of the resultant noise is suppressed. Further, at the recording, reversed magnetization is first produced in the second component film $12_2$ having smaller $H_C$, so that formation of the magnetic domains of FIG. 32C is suppressed and the magnetic domains producing little noise as shown in FIG. 5A are produced on the second component film $12_2$, and these are transferred onto the first component film $12_1$. Thus, all in all, formation of the magnetic domains of FIG. 32B and FIG. 32C can be suppressed and effective reduction of noises can be achieved.

Figure 34:
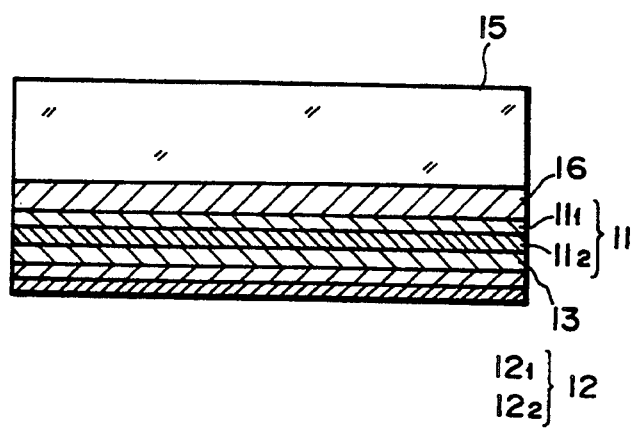

Further, in the thermomagnetic recording medium $S_1$ described in FIG. 21, its second magnetic thin film 12 may be formed of first and second component films $12_1$ and $12_2$ as shown in FIG. 34. In such an arrangement, the first and second component films $12_1$ and $12_2$ may be formed of magnetic thin films both thereof having perpendicular magnetic anisotropy, temperature characteristics of the coercive forces $H_{C21}$ and $H_{C22}$ thereof being as shown by curves 321 and 322 in FIG. 29, namely, coercive forces at room temperature $H_{C21R}$ and $H_{C22R}$ of the coercive forces $H_{C21}$ and $H_{C22}$ being set to be as $H_{C21R}>H_{C22R}$ and Curie temperatures $T_{C21}$ and $T_{C22}$ thereof being set to be as $T_{C21}<T_{C22}$, and thereby, reduction of recording noise and improvement of reproduction C/N (S/N) can be achieved. The arrangement of the second magnetic thin film 12 formed of a two-layer structure may be applied to the medium $S_2$ having a magneto-optical reproducing thin film 18 as described in FIG. 22, and in such ways, various modifications of the embodiment other than those described above can be made.

What is claimed is:

1. A thermomagnetic recording method comprising the steps of: selecting a thermomagnetic recording medium including a laminated film consisting of a first magnetic thin film and a second magnetic thin film having perpendicular magnetic anisotropy and a third magnetic thin film interposed therebetween, said films being laminated and magnetically coupled with each other, said third magnetic thin film reducing the magnetic wall energy between said first and second magnetic thin films, said third magnetic film being made of a rare earth rich metallic film, said third magnetic thin film having an anisotropy in the range extending from longitudinal anisotropy, parallel to the film surface, to a small perpendicular anisotropy, which is a smaller perpendicular magnetic anisotropy that than of said first and second magnetic thin films at room temperature and has a temperature characteristic of the effective anisotropy constant K being convex upward or linear, and having its saturation magnetization $M_s$ being from 0 to 450 emu/cm$^3$ at room temperature, of:

modulating laser light in accordance with an information signal to be recorded to produce a first heating condition to heat said medium to a temperature $T_1$ which is virtually above the Curie temperature $T_{C1}$ of said first magnetic thin film and not causing reversal of the magnetic moment in said second magnetic thin film, and a second heating condition to heat the same to a temperature $T_2$ which is above said temperature $T_{C1}$ and sufficient to cause reversal of the magnetic moment in said second magnetic thin film; and cooling the medium from the heated states so that record magnetization is formed in said thermomagnetic recording medium.

2. A thermomagnetic recording method comprising the steps of: selecting a thermomagnetic recording medium including a laminated film consisting of a first magnetic thin film formed of a first component film and a second component film, each thereof having perpendicular magnetic anisotropy and a different Curie temperature from each other, a second magnetic thin film having perpendicular magnetic anisotropy, and a third magnetic thin film interposed between said second component film of said first magnetic thin film and said second magnetic thin film, said third magnetic thin film having an anisotropy in the range extending from longitudinal anisotropy, parallel to the film surface, to a small perpendicular anisotropy, said films being laminated and magnetically coupled with each other, said third magnetic thin film reducing the magnetic wall energy between said first and second magnetic thin films, the Curie temperature $T_{C12}$ of said second component film of said first magnetic thin film being higher than the Curie temperature $T_{C11}$ of said first component film thereof, modulating laser light in accordance with an information signal to be recorded to produce a first heating condition for heating the medium to a temperature $T_1$ which is in the vicinity of said Curie temperature $T_{C11}$, not causing reversal of the magnetic moment in said second magnetic thin film, and sufficient to change the magnetic moment in said second component film of said first magnetic thin film in compliance with the magnetic moment in said second magnetic thin film and a second heating condition for heating the same to a temperature $T_2$ which is above said Curie temperature $T_{C12}$ and sufficient to cause reversal of the magnetic moment in said second magnetic thin film; and cooling the medium from the heating states so that record magnetization is formed, in compliance with the magnetization in said second component film of said first magnetic thin film, also in said first component film thereof.

3. A thermomagnetic recording method comprising the step of: selecting a thermomagnetic recording medium including a laminated film having a first magnetic thin film formed of a first component film and a second component film, each thereof having perpendicular magnetic anisotropy and a different Curie temperature from each other, a second magnetic thin film having perpendicular magnetic anisotropy, and a third magnetic thin film interposed between said second component film of said first magnetic thin film and said second magnetic thin film, said third magnetic thin film having an anisotropy in the range extending from longitudinal anisotropy, parallel to the film surface, to a small perpendicular anisotropy, said films being magnetically coupled with each other, said third magnetic thin film reducing the magnetic wall energy between said first and second magnetic thin films, and further having a magneto-optical reproducing thin film disposed in the front of said first component film of said first magnetic thin film magnetically coupled thereto, the Curie temperature $T_{C12}$ of said second component film of said first magnetic thin film being higher than the Curie temperature $T_{C11}$ of said first component film thereof, said magneto-optical reproducing film satisfying $2M_{SR}h_R H_{CR} + 2M_{S11}h_{11}H_{C11} < \sigma_{wa} + 2M_{S12}h_{12}H_{C12}$ (where $M_{SR}$, $M_{S11}$ and $M_{S12}$; $h_r$, $h_{11}$, and $h_{12}$; $H_{CR}$, $H_{C11}$, and $H_{C12}$ are saturation magnetization, film thickness, and coercive force of said magneto-optical reproducing thin film, first and second component films, respectively, and $\sigma_{wa}$ is domain wall energy between said second component film and said second magnetic thin film) and having a larger Kerr rotation angle than said first component film, modulating laser light in accordance with an information signal to be recorded to produce a first heating condition for heating the medium to a temperature $T_1$ which is in the vicinity of said Curie temperature $T_{C11}$, not causing reversal of the magnetic moment in said second magnetic thin film, and sufficient to change the magnetic moment in said second component film of said first magnetic thin film in compliance with the magnetic moment in said second magnetic thin film, and a second heating condition for heating the same to a temperature $T_2$ which is above said Curie temperature $T_{C12}$ and sufficient to cause reversal of the magnetic moment in said second magnetic thin film; and cooling the medium from the heated states so that record magnetization is formed, in compliance with the magnetization in said second component film of said first magnetic thin film, also in said first component film thereof and said magneto-optical reproducing thin film.

4. A thermomagnetic recording method comprising the steps of: selecting a thermomagnetic recording medium formed in a laminated structure of, at least, first and second magnetic thin films each having perpendicular magnetic anisotropy, wherein said second magnetic thin film is formed of first and second component films laminated to each other by exchange coupling, said first and second component films having characteristics $H_{C21R} > H_{C22R}$ and $T_{C21} < T_{C22}$, $H_{C21R}$ and $H_{C22R}$ representing coercive forces of said first and second component films at room temperature and $T_{C21}$ and $T_{C22}$ representing the Curie temperatures of the same, modulating laser light a first heating condition to heat the medium to produce a first temperature $T_1$ being virtually in the vicinity of the Curie temperature $T_{C1}$ of said first magnetic thin film and not causing reversal of the magnetic moment in said second magnetic thin film and a second heating condition to heat the medium to a second temperature $T_2$ being over said Curie temperature $T_{C1}$ and sufficient to cause reversal of the magnetic moment in said second magnetic thin film in accordance with an information signal to be recorded, and adapting in the course of the medium cooling down from the first and second heated states such that the magnetic moments within said second magnetic thin film are brought into the same state.

* * * * *